(12) United States Patent
Fader et al.

(10) Patent No.: US 11,763,095 B2
(45) Date of Patent: *Sep. 19, 2023

(54) CREATING APPS FROM NATURAL LANGUAGE DESCRIPTIONS

(71) Applicant: Google LLC, Mountain View, CA (US)

(72) Inventors: Anthony Fader, Bellevue, WA (US); Sarah Gould, Bellevue, WA (US); Praveen Seshadri, Bellevue, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,904

(22) Filed: Dec. 12, 2022

(65) Prior Publication Data
US 2023/0112303 A1    Apr. 13, 2023

Related U.S. Application Data

(63) Continuation of application No. 17/200,758, filed on Mar. 12, 2021, now Pat. No. 11,537,799, which is a continuation of application No. 16/262,692, filed on Jan. 30, 2019, now Pat. No. 10,956,681.

(60) Provisional application No. 62/623,681, filed on Jan. 30, 2018.

(51) Int. Cl.
*G06F 40/30* (2020.01)
*G06F 8/71* (2018.01)
*G06F 40/205* (2020.01)

(52) U.S. Cl.
CPC ............ *G06F 40/30* (2020.01); *G06F 8/71* (2013.01); *G06F 40/205* (2020.01)

(58) Field of Classification Search
CPC ........... G06F 40/30; G06F 40/205; G06F 8/71

USPC .............................................. 704/9
See application file for complete search history.

(56) References Cited

U.S. PATENT DOCUMENTS

| | | | |
|---|---|---|---|
| 8,903,711 B2 | 12/2014 | Lundberg et al. | |
| 9,104,287 B2 | 8/2015 | Balchandran et al. | |
| 9,183,560 B2 | 11/2015 | Abelow | |
| 9,323,833 B2 | 4/2016 | Cucerzan et al. | |
| 9,645,723 B2 | 5/2017 | Chang et al. | |
| 9,946,514 B1 * | 4/2018 | Kostello | G10L 15/1815 |

(Continued)

OTHER PUBLICATIONS

Guidelines to Convert Excel Contacts into Android, RecoveryTools, Nov. 2014, retrieved from <http://www/> ecovery-tools.org/ms-excel-to-vcard/android.html, 11 pages.

(Continued)

*Primary Examiner* — Susan I McFadden
(74) *Attorney, Agent, or Firm* — Honigman LLP; Brett A. Krueger

(57) ABSTRACT

A computer-implemented method includes receiving audio data corresponding to a spoken statement by a user and converting the audio data into a meaning representation of the natural language description for creating the application. The spoken statement includes a natural language description for creating an application. Moreover, the meaning representation includes one or more inferences made from the natural language description for creating the application. The method further includes publishing a functional version of the application based on the natural language description. The functional version of the application is executable to perform operations specified by the natural language description of the application.

20 Claims, 20 Drawing Sheets

(56) References Cited

U.S. PATENT DOCUMENTS

| | | | |
|---|---|---|---|
| 10,025,561 B2* | 7/2018 | Seshadri | G06F 8/30 |
| 10,191,721 B1* | 1/2019 | Kostello | G06F 40/30 |
| 10,379,817 B2 | 8/2019 | Huebra et al. | |
| 10,599,417 B2 | 3/2020 | Marche et al. | |
| 10,956,681 B2* | 3/2021 | Fader | G06F 40/30 |
| 11,537,799 B2* | 12/2022 | Fader | G06F 8/71 |
| 2013/0151381 A1 | 6/2013 | Klein | |
| 2014/0046923 A1 | 2/2014 | Ruble et al. | |

OTHER PUBLICATIONS

Bhawani, "App to Access Edit & Create DOC, DOCX, XLS, XLSX, PPT, PPTX Files on Android", Android Advices, May 23, 2012, retrieved from <http://androidadvices.com/app-access-edit-create-doc-docx-xls-xlsx-ppt-pptx-fil>es- ndroid/, 8 pages.

Bluestein, "Generate Excel Spreadsheets in Native Mobile Apps," Jan. 16, 2014, retrieved from https://blog.,amarin.com/generateexcelspreadsheetsinnativemobileapps/, 6 pages.

Patil, "Creating/Reading an Excel file in Android", Apr. 5, 2013, retrieved from <http://www.cuelogic.com/blog/> reatingreading-an-excel-file-in-android/, 11 pages.

Seshadri et al., "Automated Software Application Generation and Deployment," U.S. Appl. No. 15/014,942, filed Feb. 3, 2016.

USPTO. Office Action relating to U.S. Appl. No. 17/200,758, dated Apr. 19, 2022.

* cited by examiner

```
1 an Order is made up of Line Items.
2 a Line Item has a Product.
3 an Order has a Customer.
4 an Order can be Open or Closed.
5 you can Close an Open Order.
```

1 | an Order is made up of Line Items.

*Fig. 4a*

```
1  [
2    {
3      "type": "relationship",
4      "definition": {
5        "entity1": "Order",
6        "entity2": "Line Item",
7        "relation": {
8          "type": "oneToMany",
9          "isNullable": false,
10         "isPartOf": true
11       }
12     },
13     "source": "description"
14   }
15 ]
```

*Fig. 4b*

```
[
  {
    "type": "predicate",                                              608
    "definition": {
      "entity": "Order",                                   601
      "name": "Important",                                 602
      "filter": {                                                    607
        "type": "boolean",                            605
        "operator": "AND",
        "filters": [
          {
            "type": "related",
            "quantifier": {                           603
              "type": "count",
              "min": 5,
              "max": null
            },
            "relatedSet": {                           604
              "type": "base",
              "name": "Line Item"
            }
          },
          {                                           606
            "type": "predicate",
            "name": "High Priority",
            "negated": false
          }
        ]
      }
    },
    "source": "description"
  }
]
```

*Fig.6*

701 an Order is made up of Line Items.
702 a Line Item has a Product.
703 an Order has a Customer.
704 an Order can be Open or Closed.
705 you can

| | |
|---|---|
| ▶ Close an Open Order 711 | |
| Open a Closed Order 712 | |
| view Open Orders 713 | |
| add a new Open Order 714 | |

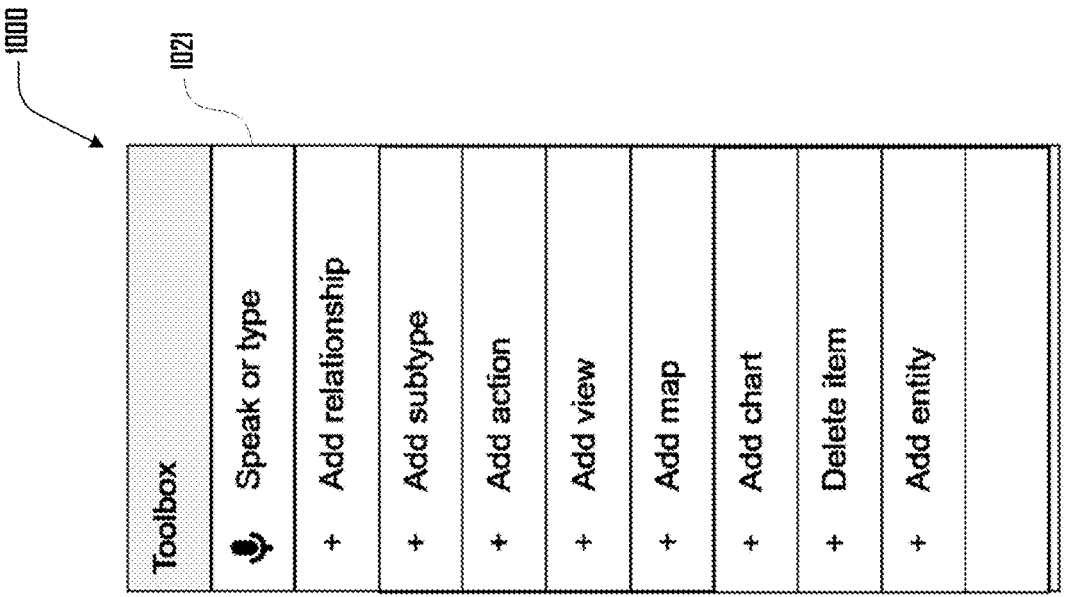
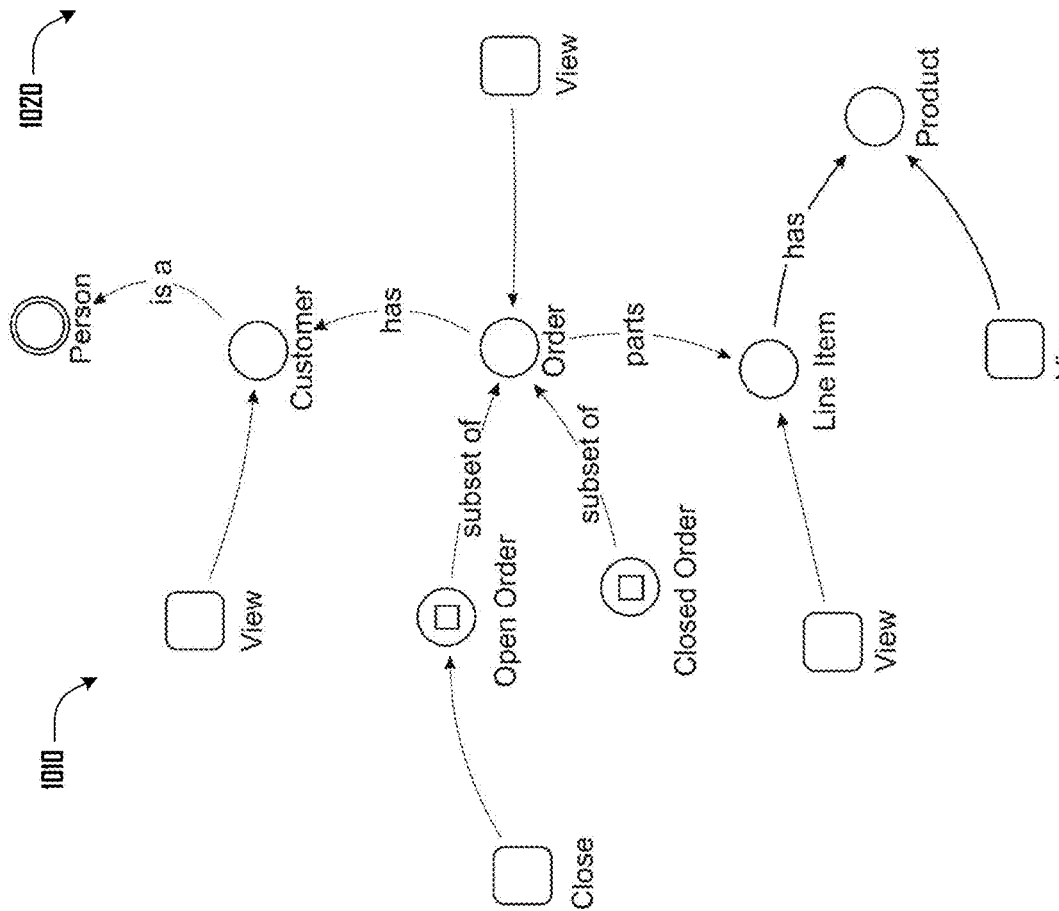
Fig. 10

1 | an Order is an entity.

```
1 an Order is an entity.
2 an Order has a Customer.
```

```
1 an Order is an entity.
2 an Order has a Customer.
3 you can edit Customers.
```
— 1300

```
1 an Order is an entity.
2 an Order has a Customer.
3 you can edit Customers.
4 an Order can be Open or Closed.
```

```
1  an Order is an entity.
2  an Order has a Customer.
3  you can edit Customers.
4  an Order can be Open or Closed.
5  you can Close an Open Order.
```

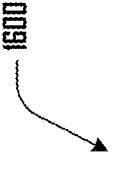

Fig. 16

```
 1  an Order is an entity.
 2  an Order has a Customer.
 3  you can edit Customers.
 4  an Order can be Open or Closed.
 5  you can Close an Open Order.
 6  an Order is made up of Line Items.
 7  you can add Line Items.
 8  a Line Item has a Product.
 9  a Product has a Manufacturer.
10  a Manufacturer is a kind of Company.
11  "an X is a kind of Company" means:
12  -  an X has a CEO.
13  -  an X has an attribute called Slogan of type Text.
14  -  an X has a Headquarters.
15  a CEO is a kind of Person.
16  a Product is Successful if it has at least 5 Line Items.
17  a Manufacturer is Successful if it has a Successful Product.
```

CREATING APPS FROM NATURAL LANGUAGE DESCRIPTIONS

CROSS REFERENCE TO RELATED APPLICATIONS

This U.S. patent application is a continuation of, and claims priority under 35 U.S.C. § 120 from, U.S. patent application Ser. No. 17/200,758, filed on Mar. 12, 2021, which is a continuation of, and claims priority under 35 U.S.C. § 120 from, U.S. patent application Ser. No. 16/262,692, filed on Jan. 30, 2019, now U.S. Pat. No. 10,956,681, which claims priority under 35 U.S.C. § 119(e) to U.S. Provisional Application No. 62/623,681, filed on Jan. 30, 2018. The disclosures of these prior applications are considered part of the disclosure of this application and are hereby incorporated by reference in their entireties.

DESCRIPTION OF DRAWINGS

FIG. 4b illustrates a meaning representation generated based on semantic parsing and translation of the natural language statement of FIG. 4a.

FIG. 6 illustrates the eight constituent parts of FIG. 5 converted into a meaning representation having corresponding constituent parts.

FIG. 7 illustrates a set of statements with one statement having a suggestion box dropdown that provides a set of suggestions for adding to the statement.

FIG. 10 illustrates a graphical user interface that includes a meaning representation visualization and an operation toolbox.

FIG. 12a illustrates a set of natural language statements where the statement of "an Order has a Customer" has been added to the set of statements of FIG. 11a.

FIG. 12b illustrates a semantic network corresponding to a meaning representation that the set of natural language statements have been translated into, which can be an updated version of the semantic network of FIG. 11b.

FIG. 13a illustrates a set of natural language statements where the statement of "you can edit Customers" has been added to the set of statements of FIG. 12a.

FIG. 13b illustrates a semantic network corresponding to a meaning representation that the set of natural language statements have been translated into, which can be an updated version of the semantic network of FIG. 12b.

FIG. 14a illustrates a set of natural language statements where the statement of "an Order can be Open or Closed" has been added to the set of statements of FIG. 13a.

FIG. 14b illustrates a semantic network corresponding to a meaning representation that the set of natural language statements have been translated into, which can be an updated version of the semantic network of FIG. 13b.

FIG. 15a illustrates a set of natural language statements where the statement of "you can Close an Open Order" has been added to the set of statements of FIG. 14a.

FIG. 15b illustrates a semantic network corresponding to a meaning representation that the set of natural language statements have been translated into, which can be an updated version of the semantic network of FIG. 14b.

FIG. 16 illustrates a set of natural language statements where further statements have been added to the set of statements of FIG. 15a.

Figure 1:
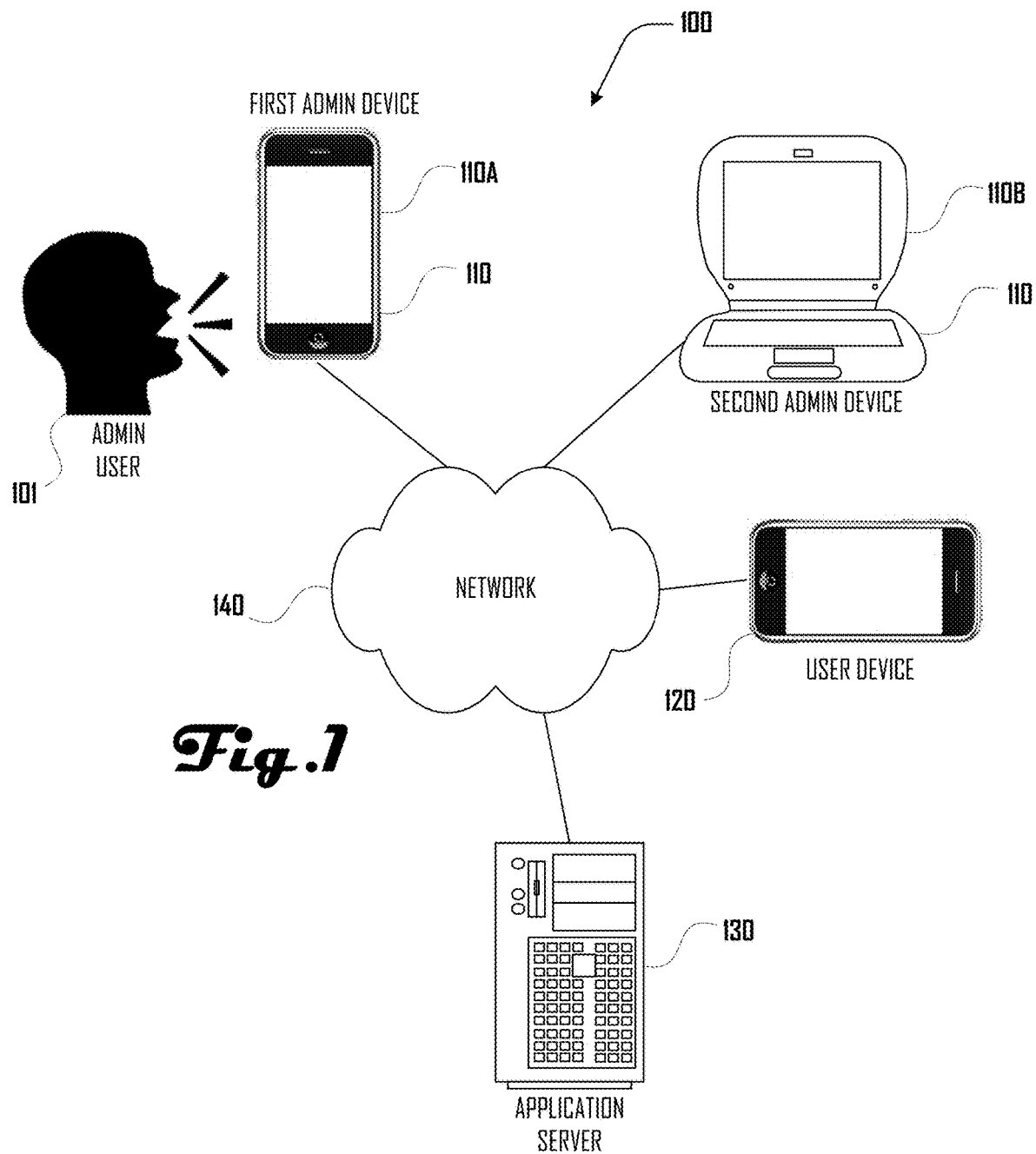
FIG. 1 illustrates an example computing system that can be used for generating a broad class of data-driven apps using human/natural language.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

In one aspect, the following disclosure describes a method, system and process to "program" (i.e., create and modify) a broad class of data-driven apps (e.g., mobile apps, chatbot apps, web apps) using human/natural language. Instead of directly using a programming language like Java, various example systems and methods can use the concepts and the vocabulary normally used by people to describe app specifications. Effectively, some embodiments become a method to automatically generate apps from concise semantically dense high-level app specifications described in natural language.

Various embodiments include a method that applies to a class of data-driven apps commonly used in business as well as consumer applications. These apps can include data sets that can be added to, deleted from, updated, and/or viewed in a variety of rich ways. For example, one embodiment includes a mobile app that allows a SalesPerson to capture Orders from Customers. Each Order has many LineItems and each LineItem is for a certain Quantity of a specific Product, in this example embodiment.

Traditionally, such a data-driven mobile app must be authored directly using a programming language (e.g., Java) in a development environment (e.g., Android Studio) and then deployed via a deployment process (e.g., publishing in the Google Play store). "No-code" technology platforms can allow such apps to be built and distributed much more easily without writing code. Such platforms (like AppSheet, www.appsheet.com) can require the app creator to describe concepts like data tables, UI views, and the like, in a stylized fashion along with formulas to define behavioral logic and detailed configuration to control various aspects of the app behavior (see U.S. patent application Ser. No. 15/014,942, filed Feb. 3, 2016 entitled "AUTOMATED SOFTWARE APPLICATION GENERATION AND DEPLOYMENT," which is hereby incorporated herein by reference in its entirety and for all purposes). In some no-code app platforms, the app definition occurs at the level of abstraction of these concepts and via a user interface rather than a descriptive language.

One example method described herein can model the same class of apps but at a higher-level of conceptual abstraction and using natural/human language. The app description in this example can be at various levels of abstraction, including: "Allow a SalesPerson to capture Orders from Customers. Each Order has many LineItems and each LineItem is for a certain Quantity of a specific Product." This description of the app in terms of the entities involved (SalesPerson, Orders, Customers, LineItems, Quantities, Products) and their relationships between them, can be sufficient to construct and create a meaningful mobile app.

Various embodiments can include one or more of the following novel aspects: (a) that the concepts involved in the app description are at the same level of abstraction that human beings naturally use when describing the app that needs to be built, and (b) that the language used to describe these concepts and the app is a natural language (English, in the case of various examples herein).

Some example embodiments can include one or more of:

The description of the app at a high-level is parsed using natural language processing (NLP) techniques into a canonical set of natural language commands.

These commands can be translated into an incomplete semantic model of the app. This can include an entity-relationship model used to represent the data entities, and this can be augmented with an application semantic model that describes the interaction concepts (e.g., "capture" Orders, "view" Products, etc.) that the end-users of the app can utilize.

This incomplete semantic model can be augmented with schemas for each of the entities and initial data sets that respect the data model including the relationships between the data entities.

This incomplete semantic model can then be augmented with user interface (UI) elements and behavioral elements to generate a complete app description for a no-code app platform like AppSheet (www.appsheet.com).

The generated app description can then be translated into a viable running app.

One or more step can utilize machine learning techniques that analyze and learn common schema models, meaningful data sets, and app artifacts from tens of thousands of existing apps (e.g., derived from the current and historical usage of a platform such as the AppSheet platform).

In various embodiments, apps can be created and modified by people with absolutely no technical experience, simply by describing the desired behaviors of the app in a natural language like English or other suitable verbal or non-verbal language. Accordingly, various embodiments can include the automated generation of functioning apps that are automatically deployable on one or more user devices, without human interaction aside from input by an administrator of the app. In other words, various embodiments can include a system (e.g., an app server) configured to receive human language input from app administrators or creators, and automatically generate, configure and deploy operable apps to user devices without human interaction at the system.

For example, various embodiments include an app server that can generate, configure and deploy operable apps to a plurality user devices without receiving code from an app administrator or creator and without a human administrator or other user at the app server generating or writing code for the app, or otherwise configuring the app, based on input from the app administrator or creator. Accordingly, various embodiments herein can be clearly differentiated from app development methods where a human app creator is required to write code for an app and/or where a human agent for the app creator writes code for an app based on instructions from the human app creator. Referring to the methods described herein, one or more of the described method steps can be performed automatically, without the interaction of a human user or administrator.

Additionally, the following disclosure includes example systems methods for creating an application (e.g., a mobile app, chatbot, webpage, content management system, etc.), from a high-level, natural language description (e.g., text, speech, or other informal representation). Accordingly, while various examples herein relate to generating mobile apps, this should not be construed to be limiting on the wide variety of other software applications that can be generated or authored using the systems and methods described and shown herein.

Turning to FIG. 1, an example system 100 is illustrated, which can be used for generating a broad class of data-driven apps using human/natural language. The example system 100 includes a first and second admin device 110A, 110B, a user device 120 and an application server 130, which are operably connected via a network 140. An admin user 101 is shown vocally interacting with the first admin device 110A.

For example, in some embodiments, one or both of the admin devices 110 can communicate with the application server 130 to generate, configure and/or modify an app, with the app being accessed and used by the user device 120. While the example of a single user device 120 is provided in FIG. 1 for purposes of simplicity, further embodiments can include deploying an app to a large plurality of user devices 120 with the app being managed by one or more admin device 110 via the application server 130.

Although the first admin device 110A and user device 120 are shown as smartphones and the second admin device 110B is shown as a laptop, it should be clear that any suitable devices can used as admin devices 110 and/or user devices 120. For example, in some embodiments an admin devices 110 and/or user devices 120 can include a smartphone, laptop computer, desktop computer, tablet computer, gaming device, smart television, wearable computer, and the like.

Similarly, the admin server 130 can include any suitable number and type of devices that are configured to perform any of the methods, or portions thereof, described herein. For example, one or more admin device can include a cloud computing system or individual server, and data associated with an app can be hosted on any suitable number of computing systems, including computing systems that may not be under the direct control of the admin devices 110 or an admin user 101.

The network 140, can include one or more suitable wired and/or wireless networks including the Internet, a cellular network, a Wi-Fi network, a Bluetooth network, a local area network (LAN), a wide area network (WAN), and the like. Accordingly, the example system of FIG. 1 should not be construed to be limiting on the wide variety of systems that can be configured to perform the methods, or portions thereof, described and shown herein.

As discussed in more detail herein, various suitable input methods can be used to generate, configure and/or modify an app. For example, in some embodiments, voice input, text input, image input, interactions with a user interface, or the like, can be used to generate, configure and/or modify an app. In embodiments including more than one admin device 110, input methods can be the same or different when generating, configuring and/or modifying an app.

Figure 2:
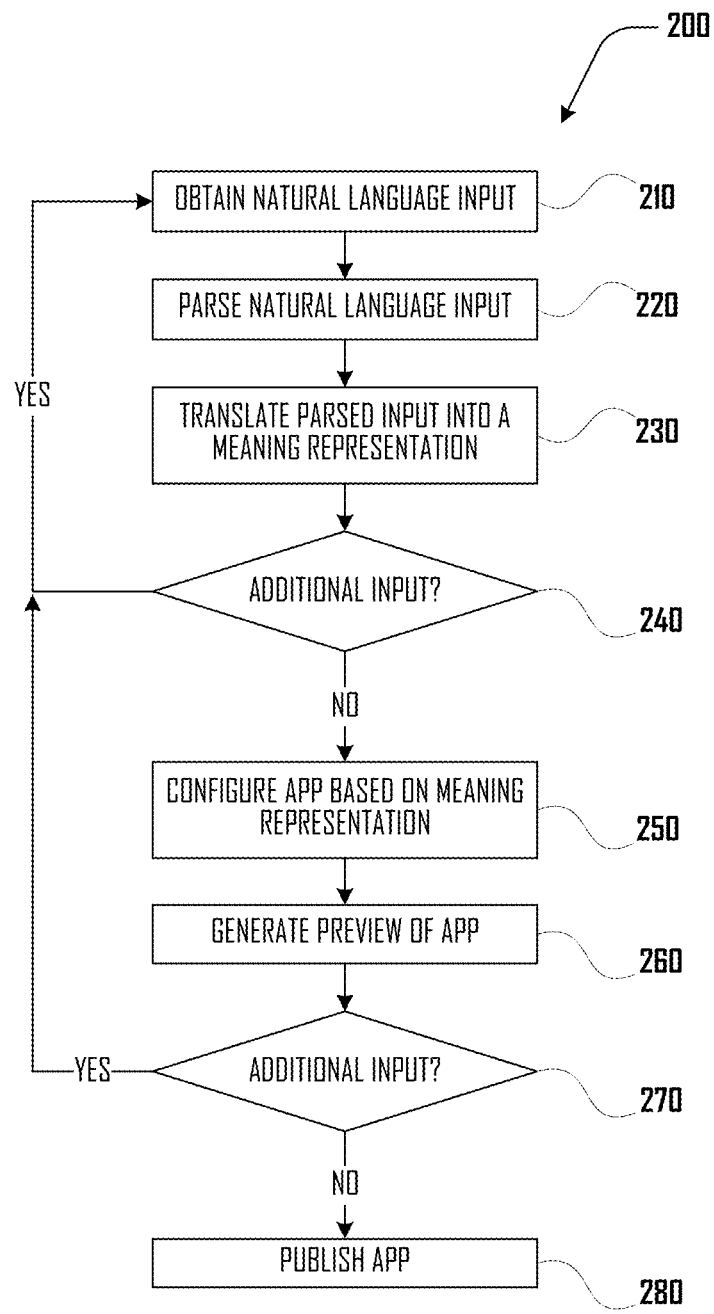
FIG. 2 illustrates an example method of generating an app using human/natural language.

Turning to FIG. 2, an example method 200 of generating an app using human/natural language is illustrated, which in some embodiments can be performed by the application server 130 of FIG. 1. The method 200 begins at 210 where a natural language input is obtained, and at 220, the natural language input is parsed. At 230, the parsed input is translated into a meaning representation, and at 240, a determination is made whether there is additional input, and if so, the method 200 returns to 210, where a natural language input is received.

Natural language input can be obtained in various suitable ways. For example, as discussed in more detail herein, natural language input can be generated from audio input from a speaking user (e.g., speaking user 101 in FIG. 1); from text input via any suitable input (e.g., touch screen, keyboard, or the like); via input into a template; or via selection of or modification of sample statements.

Figures 3A, 3B:
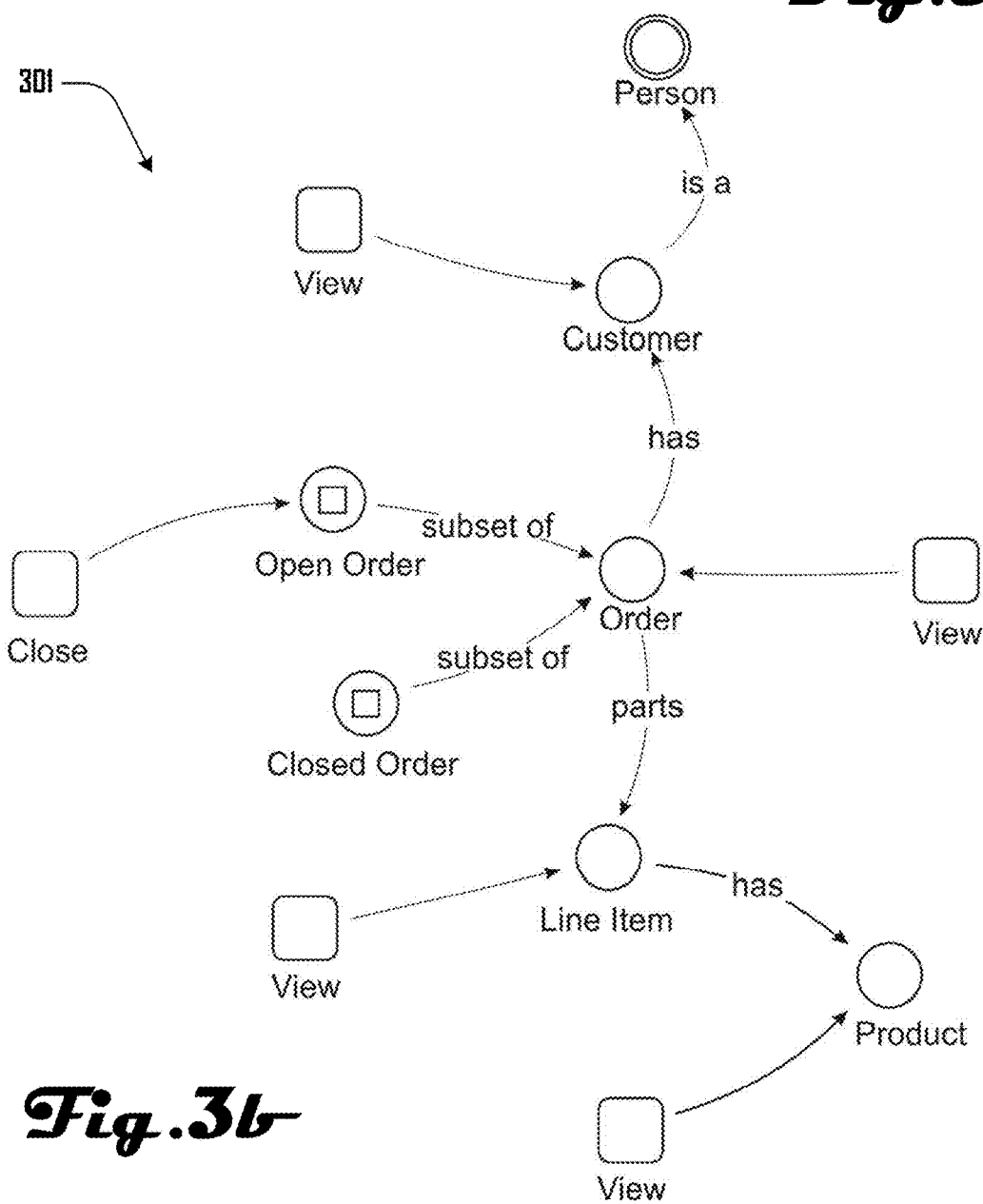
FIG. 3a illustrates an example of a set of natural language input statements.
FIG. 3b illustrates a semantic network that can be a visualization of a meaning representation corresponding to the set of natural language input statements of FIG. 3a FIG. 4a illustrates an example of a natural language statement.

Turning to FIG. 3*a*, an example of a set of natural language input statements 1-5 (300) are shown, including (1) an Order is made up of Line items; (2) a Line Item has a Product; (3) an Order has a Customer; (4) an Order Can be Open or Closed; and (5) you can Close an Open Order. In various embodiments, a given natural language input can include one or more statement lines.

For example, in the context of the method 200 of FIG. 2, in one embodiment the input of "an Order is made up of Line items" can be obtained, parsed at 220 and translated into a meaning representation, and at 240, it is determined that there is additional input, when returning to 210, the second input of "a Line Item has a Product" can be obtained, parsed at 220, and translated at 230. The method 200 in such an example can continue to receive statements 3-5 and iteratively build a meaning representation based on the translated parsed input until a meaning having all five statements 1-5 is generated (e.g., the visualized version of such a meaning representation in the form of a semantic network 301 as shown in FIG. 3*b*).

In further embodiments, a natural language input can include a plurality of statements. For example, in the context of the method 200 of FIG. 2, in one embodiment the input of statements 1-5 (300) shown in FIG. 3*a* can be received at 210 and these statements can be parsed at 220 to generate a meaning representation at 230 based on the translated parsed input (e.g., the visualized version of such a meaning representation in the form of a semantic network 301 as shown in FIG. 3*b*). Accordingly, in various embodiments a given input can include any suitable number of separate statements, including one or more, with successive input, if any, including any suitable number of separate statements, including one or more.

In various embodiments, a meaning representation can include any suitable data structure that represents the semantics of the user's description in an unambiguous, formal, and machine-readable format. In some embodiments, a meaning representation can be visually represented as a semantic network, or other suitable form as discussed in more detail herein. For example, as discussed above, a meaning representation corresponding to the set of statements shown in FIG. 3*a* can be visualized via the semantic network 301 shown in FIG. 3*b*. In various examples herein, a semantic network will be used to represent a meaning representation corresponding to a set of one or more statements; however, this should not be construed to limit the ways in which the underlying meaning representation is embodied and should not be construed to limit the numerous ways in which a meaning representation can be visualized or otherwise represented in another form.

As used herein, the closed circle symbols of a semantic network identify a thing or item or entity; circles with square cutouts identify subsets or versions of a thing or item or entity; rings identify an identity of a thing or item or entity (e.g., a customer is a person as shown in semantic network 301); and rounded squares represent actions that can be performed on things/items/entities or subsets/versions thereof.

As discussed in more detail herein, elements of a meaning representation (and visualized semantic network) can be explicitly in inherently present or inferred in the statements. For example, referring to FIGS. 3*a* and 3*b*, the "Order" circle of the semantic network 301 is connected to the "Line Item" circle with a "parts" arrow, which can be a relationship parsed directly from statement 1 of the set of statements 300, namely "an Order is made up of Line items." In another example, the connection of the "Order" circle with the "Customer Circle" can parsed directly from statement 3 of the set of statements 300, namely "an Order has a customer." Similarly, the "Open Order" and "Closed Order" circles with square cutouts can be parsed directly from statement 4 of the set of statements 300, namely "an Order can be Open or Closed."

Additionally, the semantic network 301 illustrates elements of a meaning representation that are generated by being inherently present or inferred in the statements 300. For example, the action "View" is not explicit in any of the statement 300, but can be inferred or identified as inherently present as applicable to the elements of "Customer," "Order," "Line Item" and "Product." In contrast, the action of "Close" is explicitly defined by statement 5 of the set of statements 300, namely "you can Close and Open Order." In another example, the identity of a "Customer" being a "Person," but such a relationship can be inferred or identified as inherently present in the item "Person."

Semantic parsing of natural language input (e.g., at 220 in the method 200 of FIG. 2), can be done in various suitable ways and can be configured for converting a text description of an app (e.g., statement input of "my app has Orders and Line Items") and translation into a meaning representation (e.g., at 230 in the method 200 of FIG. 2).

Turning to FIGS. 4*a* and 4*b*, an example of a natural language statement 400 and resulting meaning representation 401 after semantic parsing and translation is illustrated. In this example, the semantic parsing and translation converts the input text statement 400 of "an Order is made up of Line Items" to a meaning representation 401 that includes the following information:

There is a relationship; the relationship is between an entity called Order and an entity called Line Item; the relationship is a one-to-many relationship, which means for every Order there may be many Line Items; and the relationship is a part-of relationship, which means that each Line Item instance is a part of exactly one Order instance.

In various embodiments, a semantic parsing step and/or translation of parsed input (e.g., 220 and/or 230 of the method 200 of FIG. 2) can be responsible for creating a complete meaning representation, or portion of a meaning representation, for each sentence or statement of a set of one or more statement. In various embodiments, this can involve finding the meaning of the sub-parts of a sentence and combining the sub-parts into a coherent whole.

Figure 5:
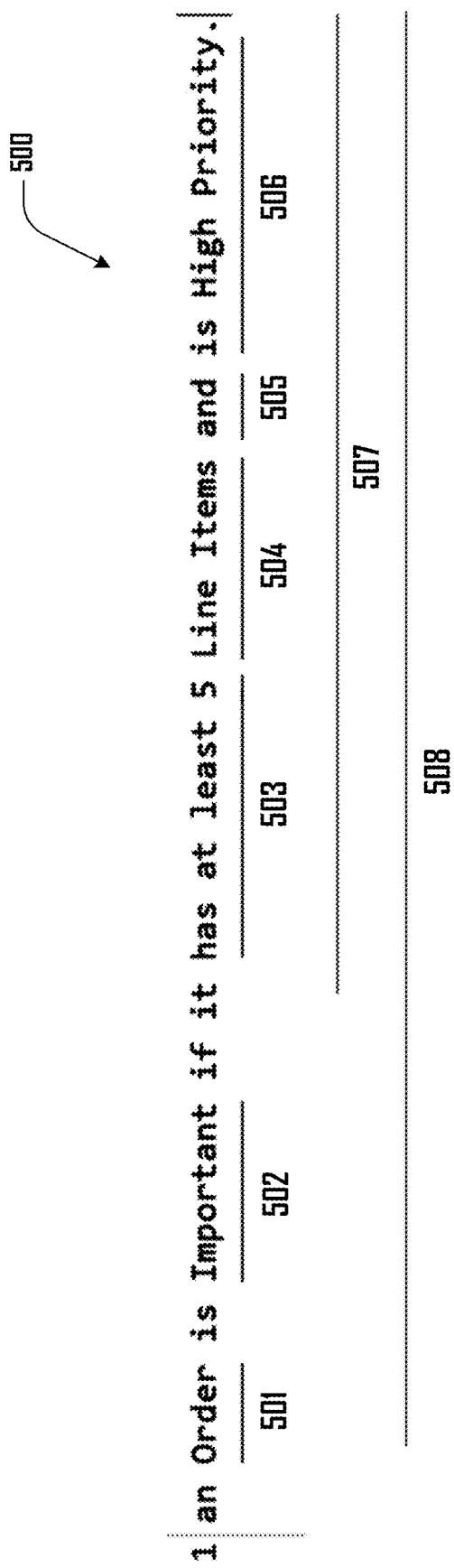
FIG. 5 illustrates a statement input being parsed into eight constituent parts.

Turning to FIGS. 5 and 6, FIG. 5 illustrates a statement input being parsed into eight constituent parts 501, 502, 503, 504, 505, 506, 507, 508, which are converted into the meaning representation 600 of FIG. 6 having corresponding constituent parts 501, 502, 503, 504, 505, 506, 507, 508.

In various embodiments, a semantic parser can be responsible for resolving syntactic and semantic ambiguities. For example, in some embodiments all of the following four sentences can be mapped to the same formal meaning representation, despite their differences:

1) An Order is Important if it has at least 5 Line Items and is High Priority.
2) An Order is Important if it is High Priority and has at least 5 Line Items.
3) Orders can be Important when they have 5 or more Line Items and have Priority set to High.
4) When an Order has at least 5 Line Items and is High Priority, then it's called an Important Order.

In some embodiments, semantic parsing can be performed by rules and/or by a black-box statistical method. In various embodiments, a meaning representation can encode one or more of the following types of example assertions about a user's app and the elements thereof.

Entities—declares the existence of an entity (e.g., an Order is an entity; a Product is an entity; Orders, Products, and Line Items are all entities; and the like).

States—declares that a particular entity can be in one of many states (e.g., An Order can be Open or Closed. (unnamed); An Order has a Priority state that can be Low, Medium, or High. (named), and the like).

Relationships—declares the existence of a relationship between entities (e.g., An Order has a Customer (one to many); An Order is made up of Line Items (one to many, part-of); An Order can have a Customer (one to many, optional), and the like).

Custom Relationships—declares that an entity has a particular relationship, defined elsewhere (e.g., A Product is Categorized; An Order can Have Choices from Products, and the like).

Predicates—declares the existence of a Boolean-valued property of an entity that can be computed from its other attributes or relationships (e.g., An Order is Big if it has at least 5 Line Items (count of relationships); An Order is Important if it is Big and has a High Priority Customer. (conjunctive); and the like).

Entity Sets—entities with states or predicates imply the existence of named subsets of entities (e.g., Big Orders (Order entities where the Big predicate is true); High Priority Customers (Customer entities whose Priority State is High); and the like).

Attributes—declaration of named properties of an entity that can take on different typed values (e.g., A Customer has an attribute called Nickname of type Text; An Order has an attribute called Channel taking values Web, Mobile, In Person; and the like).

Intents—declaration of an action that an agent can take in the app (e.g., You can view all Customers (built-in actions); You can view a map of Customers (actions that have special behavior); You can Open a Closed Order (actions that change states); You can change the Priority of a Customer from Low to High (actions that change states); A Customer can change their own Email Address (actions with constraints on which agent can perform the action); An Admin can edit all Customers; and the like).

User Types—declaration of different types of users in the app (e.g., The users of this app are Customers, Sales Reps, and Admins; and the like).

Entity Types—declaration of a class of entities in the app (e.g., A Person is a kind of entity; A Location is a kind of entity; and the like).

Entity Type Behaviors—associates a behavior with a type of entity. The behavior can be any of the above assertions (e.g. entities, states, relationships, and the like). For example, if an entity X is a Person, then: An X has an attribute called Name; and you can view a map of X. In another example, if an entity X is a Business, then: A CEO is an entity; A CEO is a kind of Person; An X has a CEO; and you can view a map of X.

Relationship Behaviors—associates behavior with a type of relationship. For example, if an entity X is Categorized, then: An X Category is an entity; An X has an X Category; and You can view X grouped by X Category. In another example, if an entity X can Have Choices from an entity Y, then: An X is made up of Y Choices; A Y Choice has a Y; and you can add Y Choices.

In various embodiments, an inference step can be responsible for filling in implicit parts of one or more statement for the app that the user does not explicitly include in the one or more statements. An inference step can operate on the formal meaning representation of the user's description statement(s) and can extend such one or more statements with additional assertions.

In the following example, the inference step expands a single descriptive sentence with over ten additional assertions about the app.

Example Text Description (created by user): "an Order has a Customer."

Example Intermediate Representation (sketch of semantic parsing output): There is a relationship between "Order" and "Customer" that is one-to-many.

Example Inferred structure (sketch of inference output):
There is a relationship between "Order" and "Customer" that is one-to-many;
"Order" is an entity;
"Customer" is an entity;
There is a view that lists all "Order" entities;
There is a view that lists all "Customer" entities;
There exists a kind of entity called "Person";
"Customer" is a kind of "Person" entity;
"Customer" has an attribute called "Name";
"Customer" has an attribute called "Email Address";
"Customer" has an attribute called "Photo";
"Customer" has an attribute called "Phone Number";
"Line Item" is an entity;
An "Order" entity has a whole-part relationship with "Line Item" entity; and
An "Order" can be "Open" or "Closed".

In various embodiments, an inference step can allow a user to provide a terse description of a desired app, and the system read between lines to generate a complete app that is consistent with their description having both elements that are explicitly defined by the user in one or more statements and also elements that are implied in the statements or that would be inherent or desirable in an app having the explicit or implied elements. Accordingly, in various embodiments, an app generation system (e.g., the system 100 of FIG. 1)

can allow users to generate robust apps, even if the users do not understand how apps work or are structured on the back end. In other words, an app generation system in various embodiments can allow unsophisticated users to generate fully operable apps based on simple descriptions by parsing the simple descriptions and expanding the simple descriptions to include elements that are implicit, inherent, or desirable in a full app having the elements described by the user.

In some embodiments, the types of inferences, implications, or addition of desirable elements can include one or more of the following examples:

Presuppositions—e.g., when the user says "an Order has a Customer" the system presupposes the existence of entities called "Order" and a "Customer."

Entity Typing—e.g., when the user says "Customer" the system can infer that the "Customer" entity is of a known class of entities called "Person."

Shared Entity Behavior—e.g., once the system has the facts that "Customer is a Person" it can add standard behaviors to the "Customer" entity, like the facts that the "Customer" has Name, Email, Photo, Phone attributes, and the like.

Common Relationships—once the system knows that "Order" is relevant, the system can deduce that there should be a "Line Item" entity with a "part-whole" relationship to "Order."

Common Behavior—the fact that the user has described "Order" and "Customer" means that in some embodiments there should be ways to view all of the instances of those entity types.

In various embodiments, an inference procedure, or the like, can use deductive reasoning and/or inductive reasoning to expand an initial set of facts about the app into a larger, more complete set. Examples of deductive reasoning and indicative reasoning in accordance with some embodiments are provided below.

Example Deductive Reasoning—for any entity X, if X is mentioned in the description, then you should be able to view all X instances in the app.

Example Inductive Reasoning—"Employee" is 90% likely to be a type of "Person" entity and 5% likely to be a type of "Location" entity.

Various other inferences, or the like, can be used to add elements or features to an app. For example, where an input statement is "The user can scan a promo code" an inference can be made that the desired app is a marketing app since marketing apps are known to usually use QR codes. Accordingly, the app can be configured to add a QR code column and enable QR code scanning in the UI of the app. In another example, where an input statement includes "The mechanic can look up the car information," an inference can be made that the desired app is an app for an auto mechanic; that cars are looked up via VIN numbers; and that VIN numbers are "Code 39" barcodes. Accordingly, the app can be configured to add the ability to scan Code 39 barcodes and lookup VIN numbers based on such scanned barcodes.

In various embodiments, both the deductive and inductive reasoning can combine the formal meaning representation of the user with a collection of background knowledge. The background knowledge can be a combination of rules and statistics.

Rule-Based Background Knowledge can include one or more of the following non-limiting examples: "Person" type entities should have a Name, Address, Photo, and the like; If there is an "Order" entity, then there should be a "Line Item" entity; Every entity should have a view; If you can view a map of an entity X, then X should have an Address; and If X has an Address, then you can view a map of X.

Statistical Background Knowledge can include one or more of the following non-limiting examples. In one example, for a set of 1,000 apps containing a "Customer" entity, 55% of the apps have "Customer" set to a "Person" type; 40% of the apps have "Customer" without a type; and 5% have "Customer set to a "Location" type. In another example, for a set of 1,000 apps containing a "Customer" entity, 33% have a "Products" entity; and 67% don't have a "Products" entity. In a further example, a logistic regression classifier can predict with 85% confidence that an "Order" entity should have a "Line Item" entity related by a part-of relationship.

Such background knowledge can come from various sources. For example, the partial app that has been constructed so far can provide a source of relevance and can indicate next steps for subsequent changes to the app. In another example, knowledge can be extracted from or generated based on analysis of (e.g., via machine learning) from apps defined by other app creators (collaborative learning for app creation). If the apps are defined in a no-code model, this can become more viable in some embodiments (all of the app definition can be learned). In a further example, knowledge can be extracted or obtained from analysis of end-users interaction with this app and with other similar apps. In yet another example, knowledge can be extracted or obtained from ontologies, schema repositories, other standardized knowledge repositories, or the like.

In various embodiments, the system can suggest changes to natural language input or to an app. In some examples, such suggestions can be provided while the user is inputting a statement, after the user has input a statement, and the like. In some embodiments, suggestions can be provided once the description has gone through semantic parsing and inference steps. Accordingly, in various embodiments, suggestions can be based on one or more of a portion of a statement that a user is inputting; a full statement that a user has input; a set of statements that the user has input; one or more fully or partially parsed statements; a meaning representation; an inferred element; an inherent element; and the like.

For example, FIG. 7 illustrates a set of statements 710, 702, 703, 704 705, with statement 705 having a suggestion box dropdown 710 that provides a set of suggestions 711, 712, 713, 714 for statement 705. As shown in this embodiments, the set of suggestions for statement 705 in the suggestion box dropdown 710 can include suggestions based on previous statements. For example, suggestions 711 and 712 can be based on statement 704, which defines that "an Order can be Open or Closed" with suggestions 711 and 712 suggesting further operations that may be desirable to perform on an "Order." Suggestions 713, 714 can provide suggestions for further actions that may be desirable to perform related to "Open Orders."

Suggestions and inference can be similar in various examples, but can be applied in different ways in accordance with some embodiments. For example, in various embodiments, an inference is automatically added to the app. In some embodiments, a suggestion can be displayed to the user for confirmation before being added to the app.

The suggestions can be derived using logical deduction, using statistical induction using the same techniques as an inference mechanism, or the like. In some embodiments, users can either accept a suggested change to the app, input or statements or decline it.

Suggestions can be displayed in various places in a user interface, including in line with statements, in the authoring tool, in the visualization of a meaning representation (e.g., a semantic network), in the live preview of an app, and the like.

One or more app administrator can write descriptive sentences about a desired app as discussed herein, and input systems and methods can be embodied in different types of suitable tools. In one example, as shown in FIG. 7, a text authoring tool, the user can type out one or more description into a text box using a keyboard or have speech-to-text input text into a text box. In some embodiments, the system can suggest likely or potentially desirable changes to the description using an autocomplete dropdown box 710. The user can choose from these suggestions as a way to guide their app creation.

In some examples, an app creator can also create an app description using a speech and/or dialog system. In one embodiment, the creator can conduct a dialog with the system via a text input system (e.g., like a messaging conversation). In another embodiment, the creator can speak into a microphone and describe an app verbally. The system can use automatic speech recognition to convert spoken statement(s) into a text format. In various embodiments, the system can guide the user through the process of describing their app by asking questions via audio, text or visual output.

For example, the following is an example of a dialog between a creator user and the system, where the system guides the user through the process of describing their app by asking questions. Such an example dialog can be via speech, audio, and/or text.

System (S): What are the main things in your app?
User (U): My app has orders, customers, products, and line items.
S: Okay, I'll add those to the app. Are there any relationships between those items?
U: Well, every order has a customer and a collection of line items. Each line item has a product.
S: Okay, I've added those relationships. Any others?
U: No.
S: What are some of the things you can do in your app?
U: First of all, each order can be either open or closed. I want a view of my open orders and a view of my closed orders.
S: Okay, I've added those.
[Dialog can continue] . . . .

Returning to the method 200 of FIG. 2, at 240, where there is no additional input, the method 200 continues to 250, where an app is configured based on the meaning representation that was generated at 230. At 260, a preview of the app is generated. For example, as discussed in more detail herein, a simulation of the app can be presented in a user interface that an app creator is interacting with.

At 270, if there is additional input, the method 200 returns to 210, where the input is received. However, if there is no additional input at 270, the method 200 continues to 280 where the app can be published such that it becomes available for use by one or more user devices (e.g., user device(s) 120 as shown in FIG. 1).

Figure 8:
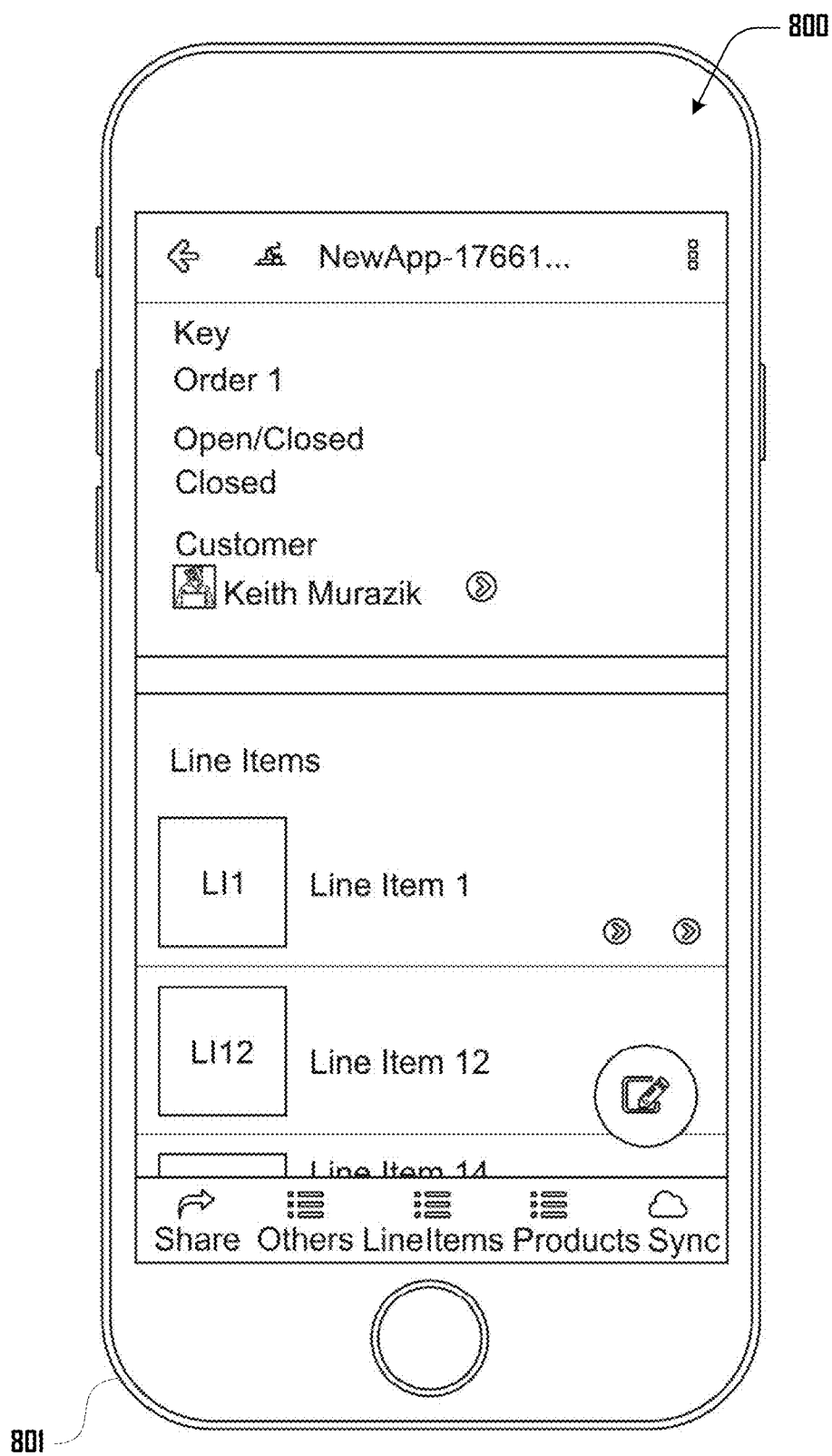
FIG. 8 illustrates an example of an interface of an app being presented on a smartphone.

As discussed herein, a meaning representation generated from one or more statements can be translated into a mobile app. For example, FIG. 8 illustrates an example of an interface 800 of an app being presented on a smartphone 801, which in some embodiments can be a user device 120 or admin device 110 as shown and described in FIG. 1. In the example of FIG. 8, the system has created a phone app where a user can manage customers, orders, and products. The app, in this example, has been populated with mock data so the app can be immediately used and explored. However, in other examples, it can be populated with real user data.

While the method 200 of FIG. 2 illustrates one example method of creating an app, it should not be construed to be limiting on the wide variety of suitable methods that can be used to generate an app. For example, in various embodiments, a method of generating an app from a description can include one or more of the following example steps:

Authoring—the app creator describes the app using one or more natural language statements;

Semantic Parsing and Translation—parsing the one or more statements and translating the one or more statements into a new meaning representation or incorporating into an existing meaning representation;

Inference—combining or adding background knowledge to the one or more statements and/or to the meaning representation to generate a complete app;

Suggestions—recommending useful, desirable or necessary changes to the statements and/or meaning representation to assist the app creator in generating an app that has functionalities and elements that would be useful, desirable or necessary to the app, even if the app creator is not aware that such functionalities or elements would be possible, useful, desirable or necessary to the app.

Visualization—displaying the inferred structure to the end user, based at least in part on a meaning representation, which can include inferred or inherent elements along with incorporated suggestions;

Translation—converting the inferred structure to the app;

Data Mocking—creating realistic mock data to populate the app; and

Live Previewing—displaying an interactive version of the finished app.

While FIG. 2 illustrates one example method 200 having successive steps, in further embodiments, various processing and/or output can occur in parallel or in real time. For example, in some embodiments, natural language input can be parsed and translated into a meaning representation as the input is being obtained and a preview of the app can be updated in real time as well. Accordingly, steps 240, 270 where a determination is made whether there is additional input can be absent; can include a timer to wait for additional input; or can include a determination that input of a given statement has ended or is ready to be processed (e.g., via a creator user pressing 'enter' on a keyboard or interface).

A method of generating an app can be iterative and/or incremental. For example, one or more app creator can start with an empty description and an empty app (e.g., the app has no behavior). The app creator can incrementally revise their app description. For example, with every change to the description, the app creation tool can react and create a new version of the app that is consistent with the latest version of the description. At any point, the user can stop describing their app and interact with a live preview and can publish the app so that it is live and accessible to a plurality of users.

Figure 9:
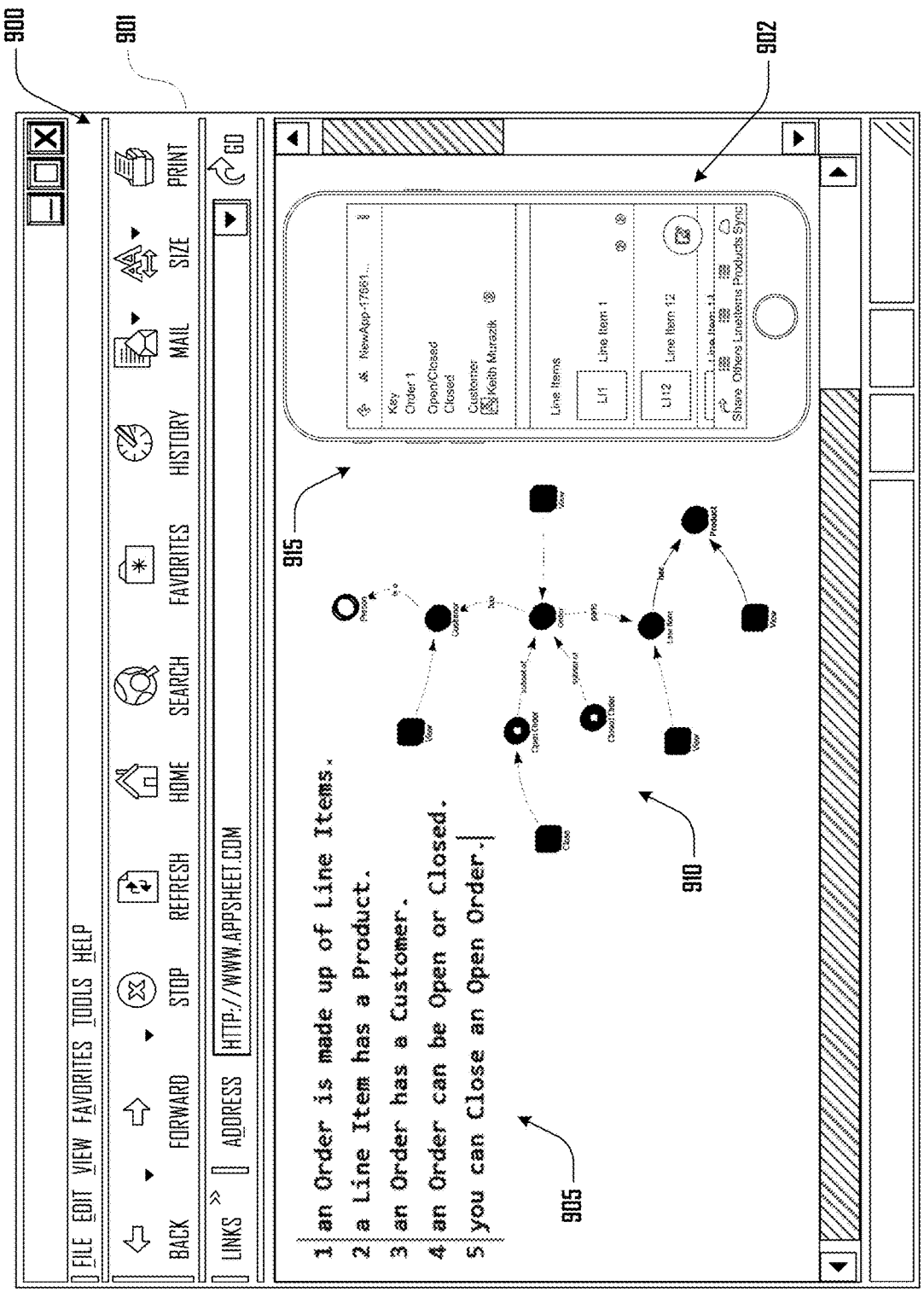
FIG. 9 illustrates an app creation interface that includes a browser that presents an interface that displays a set of one or more statements, a meaning representation visualization, and a mockup of the app that emulates the configuration and/or functionalities of the app based at least in part on the meaning representation.

In various embodiments, one or more app creating stages or creating elements can be visible to the app creator at once, in a single view. For example, FIG. 9 illustrates an app creation interface 900 which, in this example, includes a browser 901 that presents an interface 902 that displays a set of one or more statements 905, a meaning representation visualization 910 (e.g., a semantic network), and a mockup 915 of the app that emulates the configuration and/or functionalities of the app based at least in part on the meaning representation.

In various embodiments, an app creator can interact with one of a plurality of creation elements (e.g., statements 905, meaning representation visualization 910, mockup 915, and the like) and any changes or additions can affect the other creation elements. For example, an app creator can add statements to the set of statements 905 and resulting changes to a meaning representation can be reflected in the meaning representation visualization 910 and/or mockup 915. In another example, an app creator can add, modify or configure elements of the meaning representation visualization 910 and resulting changes in the meaning representation can be reflected in one or both of the set of statements 905 and mockup 915. In a further example, an app creator can add, modify or configure elements of the mockup 915 and resulting changes to the meaning representation can be reflected in one or both of the set of the set of statements 905 and meaning representation visualization 910.

As discussed herein, an app creation interface can include a live preview of the app generated from the user's description. The app can be constantly updated to reflect the latest description entered by the user. The type of preview, in some examples can be determined by the target app platform(s). For example, for one or both of a mobile app or a chatbot, the mockup interface of one or both of such apps can be presented in an editor interface page.

In another embodiment, an app creator can describe or configure an app via a graphical user interface 1000 as shown in FIG. 10, which includes a meaning representation visualization 1010 and an operation toolbox 1020. In this example version of an app creation tool, an app creator can directly manipulate the meaning representation visualization 1010 of an app using a point-and-click interface. For example, the app creator can use the toolbox 1020 of operations, which can allow selected operations be applied to or removed from the app meaning representation in order to change the behavior of the app.

In some embodiments, one of the options in the toolbox 1020 can be a "Speak or type" option 1021 that launches another authoring tool (e.g., text or speech dialog as discussed herein). In some examples, any changes made in this authoring tool can be reflected back in a text-only description of the app (e.g., one or more natural language statements) and/or a mockup the app.

In various embodiments, multiple app creators or administrators can collaborate on authoring the same app. For example, referring to FIG. 1 each admin device 110A, 110B can run an independent copy of an app authoring tool and can communicate with the application server to author, configure, create and/or edit a given app. For example, when the first admin 101 makes a change to the app via the first admin device 110, the change can be reflected immediately in the interface of second admin device 110B. In other words, in some embodiments, the first admin 101 can make changes to the app via the first admin device 110B, which are communicated to and configured a meaning representation of an app, and the changes to the meaning representation can be pushed to the second admin device 110B so that an admin user associated with second admin device 110B can work with the current version of meaning representation that defines the app being authored. In further embodiments, one or more natural language statements, or the like, can be pushed to the second admin device 110B so that an admin user associated with second admin device 110B can work with the current version of a set of natural language statements that defines the app being authored. For example, in some embodiments, the second admin device 110B can receive a current set of natural language statements associate with an app being developed and an admin user associated with the second admin device 110B can add to, modify, or delete natural language statements from the current set of natural language statements to configure the app being developed.

In various embodiments, the plurality of admin users can use one or more of the above example authoring tools in various embodiments, with different admin user being able to use different versions of tools in some embodiments. For example, User1 can be using a Graphical Version of an app authoring interface, while User2 is using a Speech Dialog Version of an app authoring interface. In some embodiments, the app authoring system can track and record a history of the respective changes made by each admin user. For example, when User1 adds a new entity to the app description, a record can be kept associating that change with User1's identity, as well as the time of the change. Additionally, in some embodiments, admin users can add comments and notes to the different parts of one or more of the app description, meaning representation, visualization of the meaning representation, mockup of the app, one or more statements that define the app, and the like. Also, in various embodiments an app authoring tool can keep a revision history of changes made to the app over time. Users can roll back to earlier versions of the app to undo work, or create a copy of a version of the app and start a new timeline of revisions.

As discussed herein, in various embodiments, as an admin user describes a desired app, a visualization of an inferred, intermediate meaning representation can be displayed to them. For any given description, there can be multiple types of visualizations that can be generated in various embodiments. In some examples, the user can switch between two or more different visualizations depending on what type of information they are interested in gathering.

For example, visualizations of a meaning representation can include one or more of the following types:

High Level Overview—can show a summary of all parts of the app with coarse granularity;

Data-Oriented View—can show details about the different entities in the app, along with their states and attributes, with fine granularity; and Behavior-Oriented View—can show details about the different actions, behaviors, tasks, and intents that the app has, with fine granularity.

A visualization of a meaning representation can also have hooks that allow the admin user to modify the app description or meaning representation directly from a visualization interface (see, e.g., the discussion of authoring tools herein).

In various embodiments, a visualization of a meaning representation can include a semantic network view of the app. A semantic network (see, e.g., semantic network 301 of FIG. 3*b*) can include a visualization made up of nodes, edges, and labels. The nodes in the semantic network can represent elements of the app (e.g. entities, intents, entity types, and the like). The edges in the semantic network can represent relationships between the elements of the app (e.g. entity relationships, the entity a behavior is related to, etc.).

Turning to FIGS. 11*a*, 11*b*, 12*a*, 12*b*, 13*a*, 13*b*, 14*a*, 14*b*, 15*a*, 15*b*, 16 and 17, a set of examples of how different sets of one or more natural language statements can be represented as semantic networks after being translated into a meaning representation that the semantic network is based on. In the following examples, behavior nodes are rounded squares, entity nodes are blue circles, entity type nodes are rings, and entity subset nodes are circles with a square center cutout.

Figures 11A, 11B:
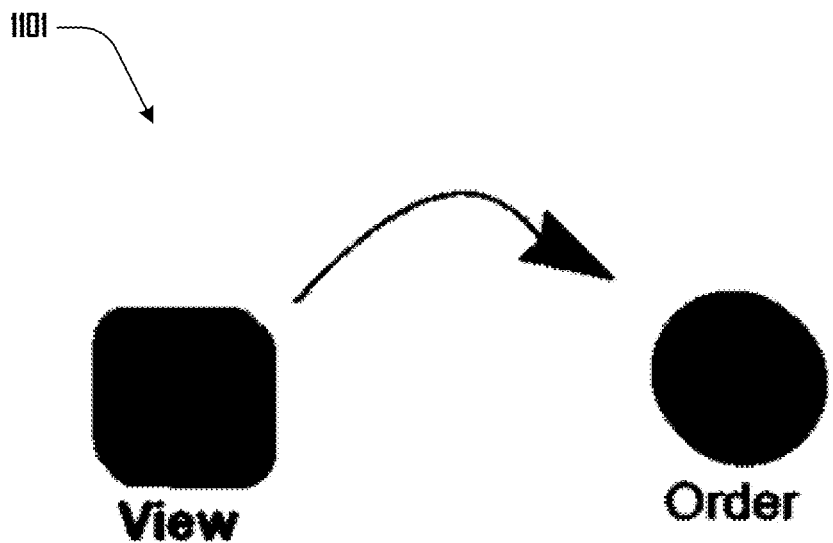
FIG. 11a illustrates a set having a single natural language statement of "an Order is an entity."
FIG. 11b illustrates a semantic network corresponding to a meaning representation that the natural language statement of FIG. 11a has been translated into.

FIG. 11*a* illustrates a set having a single natural language statement 1100 of "an Order is an entity" and FIG. 11*b* illustrates a semantic network 1101 corresponding to a meaning representation that the natural language statement 1100 has been translated into. In this example, an order being an entity is identified by the entity node labeled "Order" and the "View" behavior signified by the rounded square has been inferred, with the arrow from the "View" behavior node to the "Order" node signifying that the "View" behavior can be applied to "Order" entities. In other words, an order can be viewed.

Figures 12A, 12B:
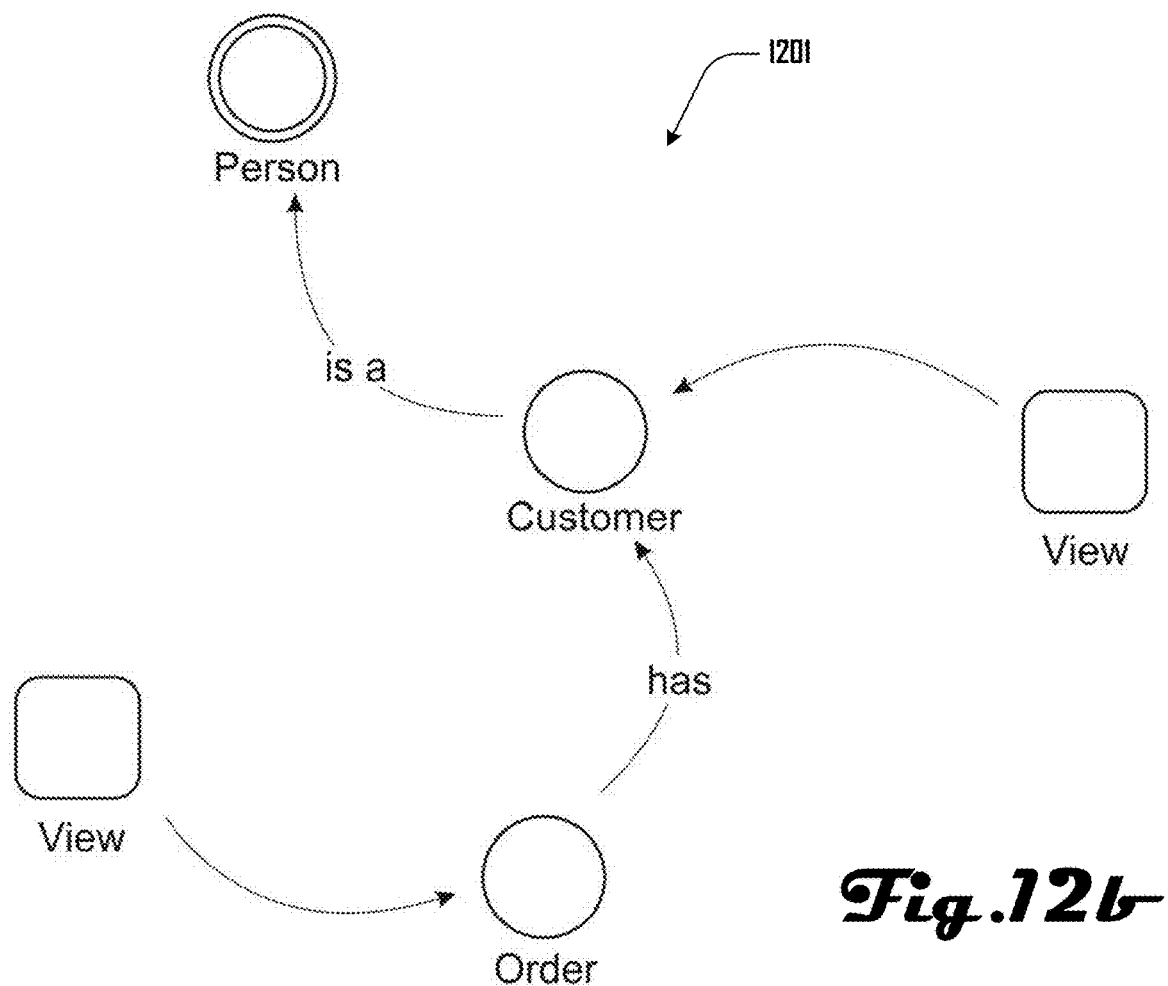

FIG. 12a illustrates a set of natural language statements 1200 where the statement of "an Order has a Customer" has been added to the set of statements 1100 of FIG. 11a. FIG. 12b illustrates a semantic network 1201 corresponding to a meaning representation that the set of natural language statements 1200 have been translated into, which can be an updated version of the semantic network 1101 of FIG. 11b based on the addition of the statement of "an Order has a Customer" to the set of statements 1100 of FIG. 11a to generate the set of statements 1200.

In the example of FIGS. 12a and 12b, the "Customer" node has been added to the semantic network 1201 with the "has" edge pointing from the "Order" node to the "Customer" node based on statement 2 of the set of statements 1200. The "Person" entity type and "View" behavior and edges associated therewith have been inferred.

Figures 13A, 13B:
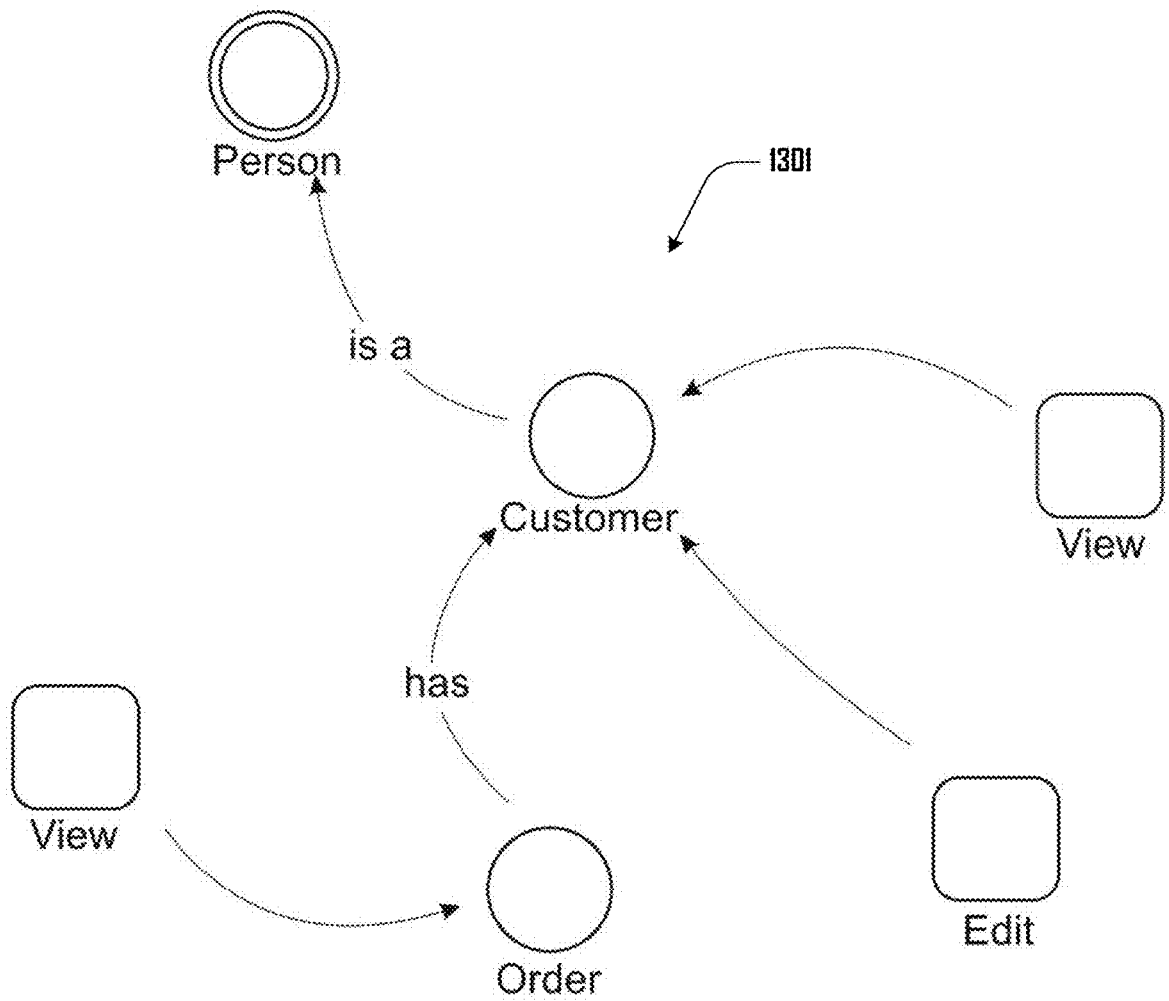

FIG. 13a illustrates a set of natural language statements 1300 where the statement of "you can edit Customers" has been added to the set 1200 of FIG. 12a. FIG. 13b illustrates a semantic network 1301 corresponding to a meaning representation that the set of natural language statements 1300 have been translated into, which can be an updated version of the semantic network 1201 of FIG. 12b based on the addition of the statement of "you can edit Customers" to the set of statements 1200 of FIG. 12a to generate the set of statements 1300.

In the example of FIGS. 13a and 13b, the "Edit" behavior node has been added to the semantic network 1201 with the edge pointing from the "Edit" behavior node to the "Customer" node based on statement 3 of the set of statements 1300.

Figures 14A, 14B:
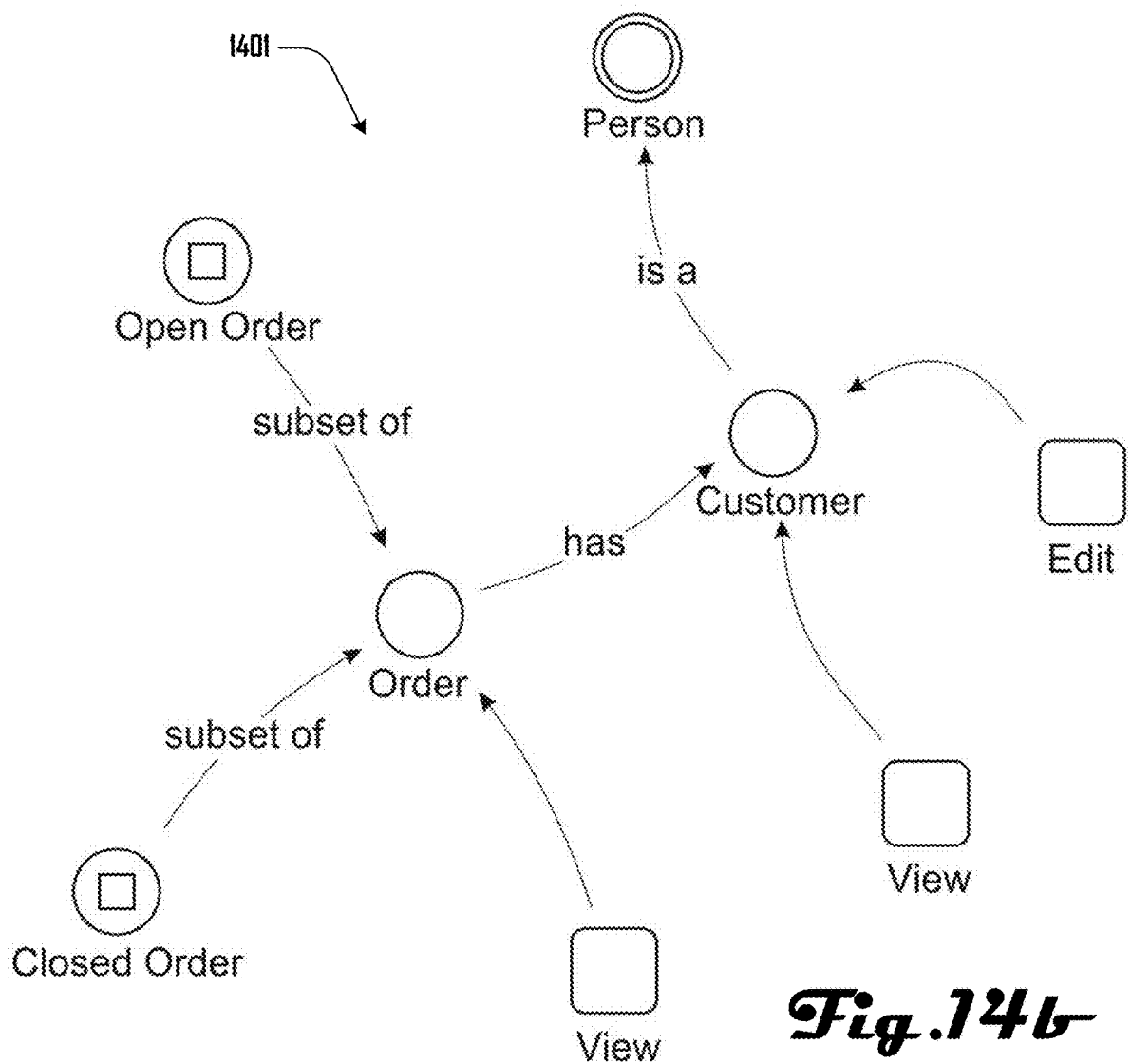

FIG. 14a illustrates a set of natural language statements 1400 where the statement of "an Order can be Open or Closed" has been added to the set of statements 1300 of FIG. 13a. FIG. 14b illustrates a semantic network 1401 corresponding to a meaning representation that the set of natural language statements 1400 have been translated into, which can be an updated version of the semantic network 1301 of FIG. 13b based on the addition of the statement of "an Order can be Open or Closed" to the set of statements 1300 of FIG. 13a to generate the set of statements 1400. In the example of FIGS. 14a and 14b, the "Open Order" and "Closed Order" subset nodes have been added to the semantic network 1401 with the respective edges pointing to the "Order" node therefrom based on statement 4 of the set of statements 1400.

Figures 15A, 15B:
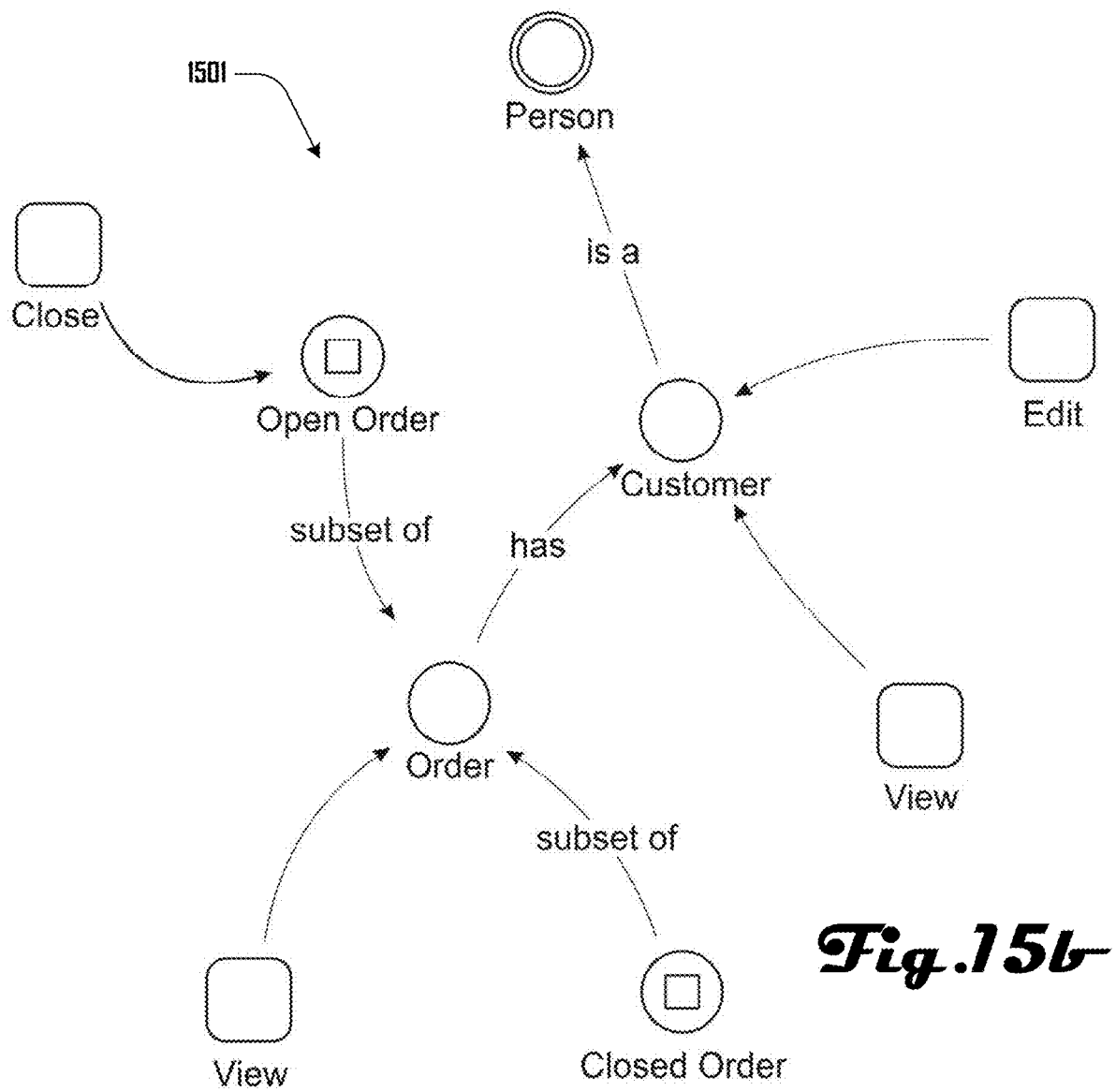

FIG. 15a illustrates a set of natural language statements 1500 where the statement of "you can Close an Open Order" has been added to the set of statements 1400 of FIG. 14a. FIG. 15b illustrates a semantic network 1501 corresponding to a meaning representation that the set of natural language statements 1500 have been translated into, which can be an updated version of the semantic network 1401 of FIG. 14b based on the addition of the statement of "you can Close an Open Order" to the set of statements 1400 of FIG. 14a to generate the set of statements 1500. In the example of FIGS. 15a and 15b, the "Close" behavior node has been added to the semantic network 1501 with the edge pointing to the "Open Order" node therefrom based on statement 5 of the set of statements 1500.

Figure 17:
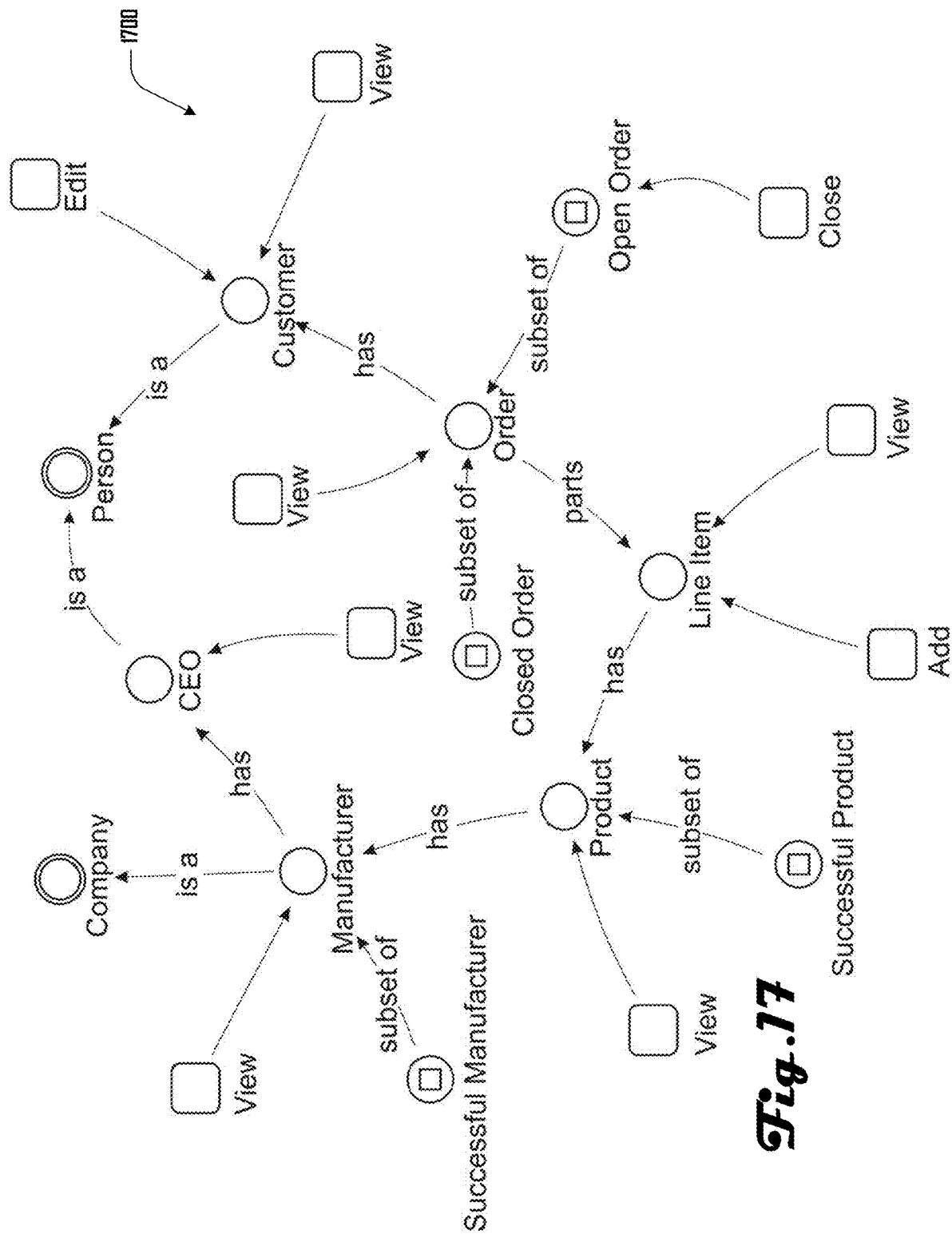
FIG. 17 illustrates a semantic network corresponding to a meaning representation that the set of natural language statements have been translated into, which can be an updated version of the semantic network of FIG. 15b.

FIG. 16 illustrates a set of natural language statements 1600 where statements 6-17 have been added to the set of statements 1500 of FIG. 15a. FIG. 17 illustrates a semantic network 1700 corresponding to a meaning representation that the set of natural language statements 1600 have been translated into, which can be an updated version of the semantic network 1501 of FIG. 15b based on the addition of statement 6-17 to the set of statements 1500 of FIG. 15a to generate the set of statements 1600.

In various embodiments, a formal meaning representation, including any inferred statements or elements, can be published to a target app platform. The target app platform (or target) can be various suitable target apps, including a mobile app (e.g., hosted on AppSheet (see U.S. patent application Ser. No. 15/014,942, filed Feb. 3, 2016 entitled "AUTOMATED SOFTWARE APPLICATION GENERATION AND DEPLOYMENT," which is hereby incorporated herein by reference in its entirety and for all purposes)).

Further examples, can include chatbot apps (e.g., hosted on Google DialogFlow); a messaging platform (e.g., Facebook Messenger or Slack or SMS or the like); a voice telephone system; an in-home device (e.g., Alexa or Google Home); Web apps (e.g., a Ruby On Rails app serving a webpage); Internet of Things (IoT) apps (e.g., an app that collects information from sensors in a field and alerts users when there are anomalous readings); Serverless Functions (e.g. a web service accessible via an API that looks up tax rates based on a geographical address); Machine Learning functions (e.g. a web service accessible via an API that can predict the sentiment (positive/negative) in a customer's textual feedback, or a service that can predict the likelihood that a new customer will end up purchasing a product.); Entire web services that involve a combination of the other app elements (e.g. a scheduling-dispatch service (like Uber) to coordinate vehicles and pickups, or a video browsing and playback service (like Netflix)); and the like. Accordingly, while various examples herein discuss mobile apps, this should not be construed to be limiting on the wide variety of apps and other software systems that the present methods can be applied to.

In some embodiments, a single assertion from the formal meaning representation can be mapped to multiple aspects of the target app. For example, the assertion "you can Close an Open Order" might imply certain data permissions, data schemas, and views in the target app.

Publication of a generated app to one or more app platform can include translation of the meaning representation and other features that define the app to conform to protocols, semantics or structure of a given app platform.

For example, publication to a mobile app platform in some embodiments can include one or more of the following:

Add datasets for each entity (e.g., "An Order is an Entity"=>create a table called Orders)

Add schemas for each dataset (e.g., Create a primary Key column for each table; "An Order has an attribute called Name of type LongText"=>create a column on the Orders table called Name with type LongText; "An Order can be Open or Closed"=>create an Enum type column called Open/Closed on the Orders table that takes values {Open, Closed}).

Add data slices for each entity subset (e.g., Create a slice of the Orders table called Open Orders that filters all the rows according to the condition [Open/Closed]="Open")

Add data permissions for each dataset and slice (e.g., "You can add new Orders"=>allow the add row operation on Orders).

Add UX views for relevant actions (e.g., "You can view a map of Customers"=>create a Map-type UX view of Customers where the column Address determines the location on the map).

Add data actions for relevant actions (e.g., Create a button that when clicked, changes the Open/Closed column of an Order from Open to Closed).

Add formatting rules for subtypes (e.g., High Priority customers should be highlighted in Red; Low Priority customers should be highlighted in Green; Closed Orders should be Grey; Customers should use user-icon.jpg as an icon).

For example, publication to a chatbot app platform in some embodiments can include one or more of the following:

Add chatbot entities for each entity in the dataset (e.g., Create Customer, Order, Product, Line Item entities; Add synonyms for each (e.g. "Product" could be called "Goods"); Add chatbot intents for each action; Create a "Add new Customer" flow that asks "What's the name of the customer you would like to add?" "What is the Customer's address?" etc.)

Automatically generate training examples (e.g., Use templates to generate training data for the dialog system; if you have an "add new Customer" intent, add the following examples of how it could be phrased "I'd like to add a new Customer" "Create a new Customer").

Accordingly, in various embodiments, one or more admin creator can generate a platform-neutral app that can then be translated for the specifications of various different app platforms. Additionally, in some embodiments, the same app can be published on a plurality of different app platforms and be governed by a master meaning representation and other features that define the app.

In various embodiments, a translation step can create a new app on one or more target app platform as discussed herein. However, in some examples, the app itself will be empty, since there is no data available. For example, there would be a notion of a Customer and an Order and the relationship between them, but there are no specific examples of Customer instances.

To create a high-fidelity version of the app, some embodiments of the system can generate mock data for each entity in the formal description. To do this, it can use resources such as a large repository of example datasets for different types of entities; a generic technique for generating valid data values; and the like.

Figure 18:
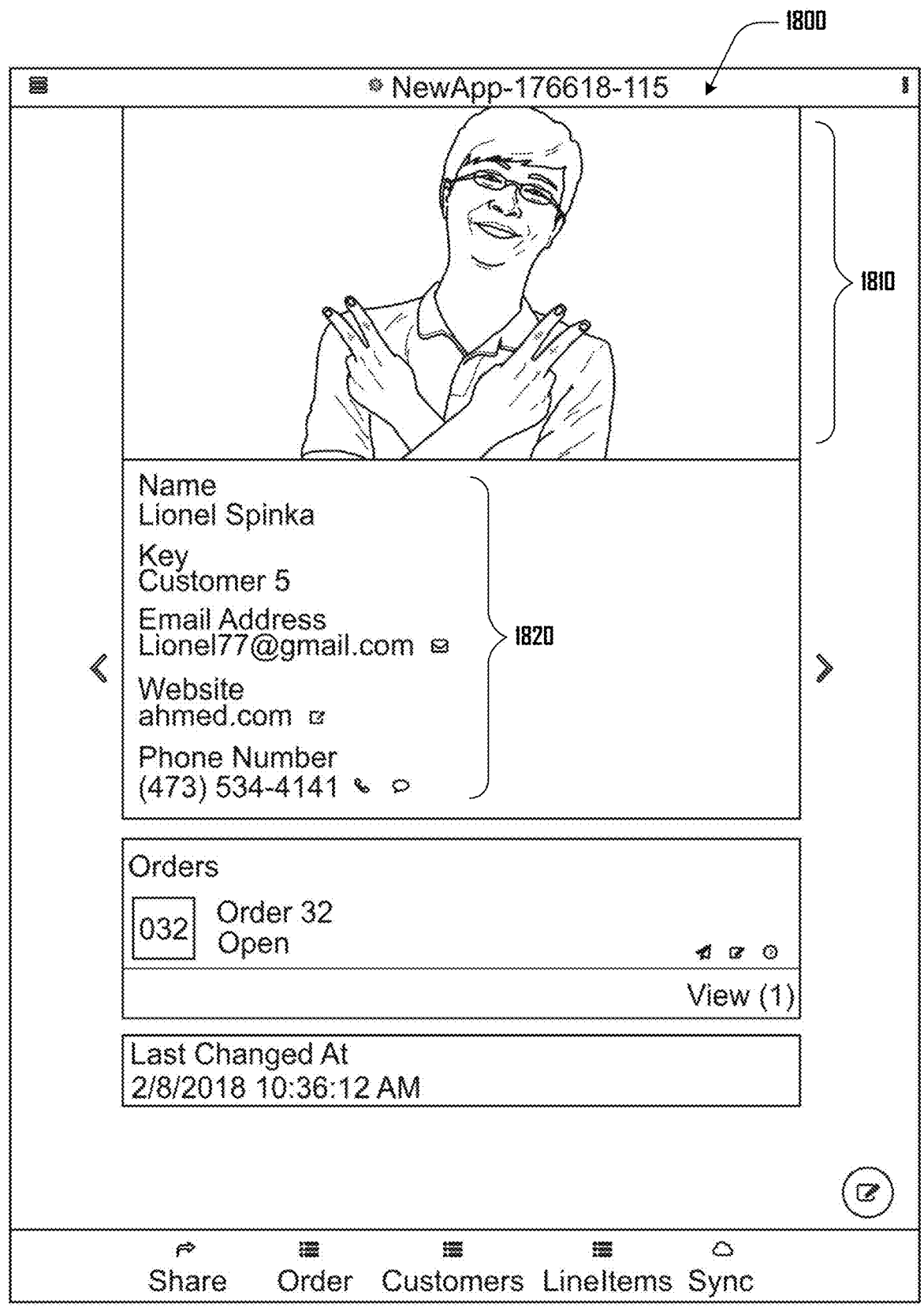
FIGS. 18, 19 and 20 illustrate examples of mock data being added to an app, including for a Person-type entity.
Figure 19:
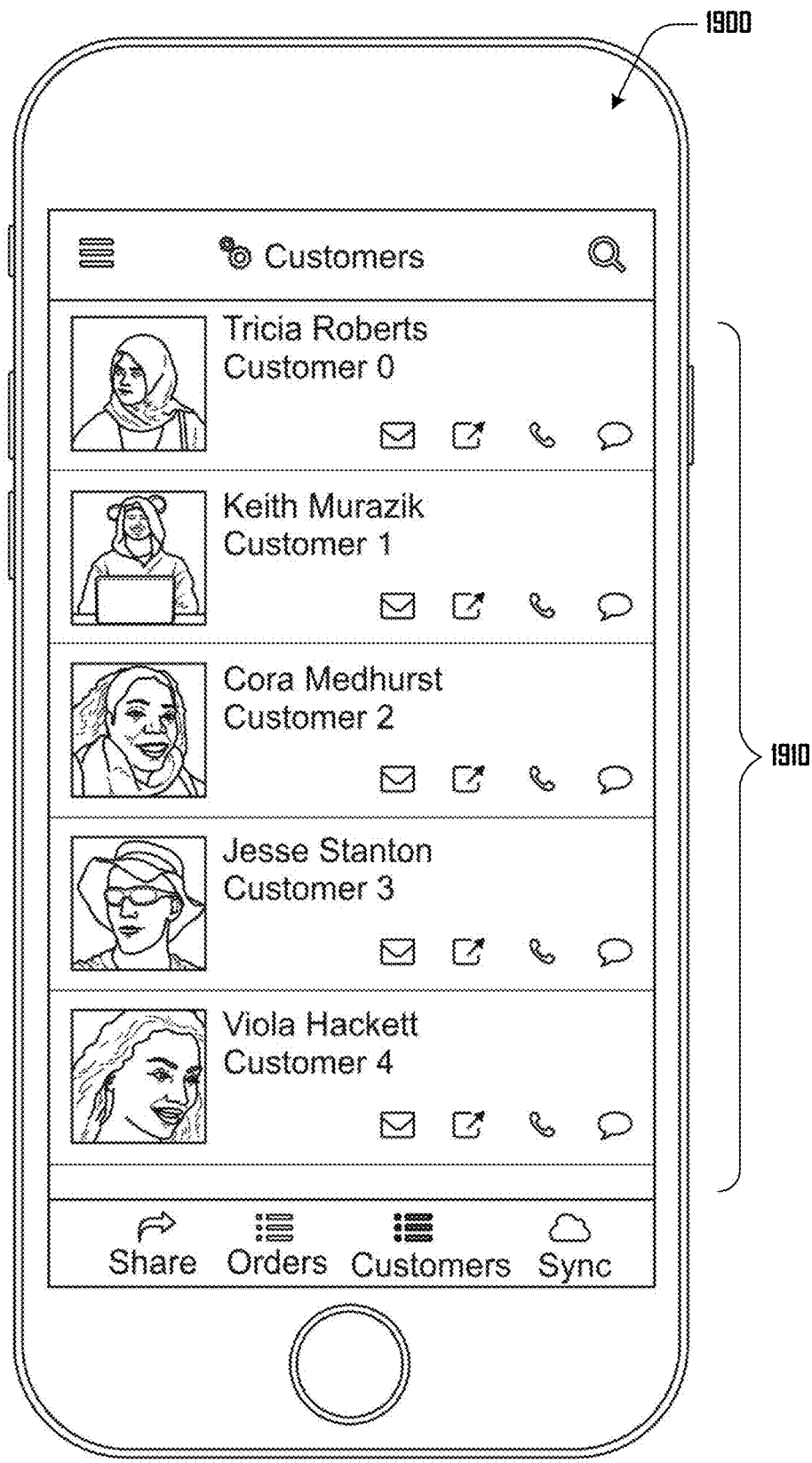
Figure 20:
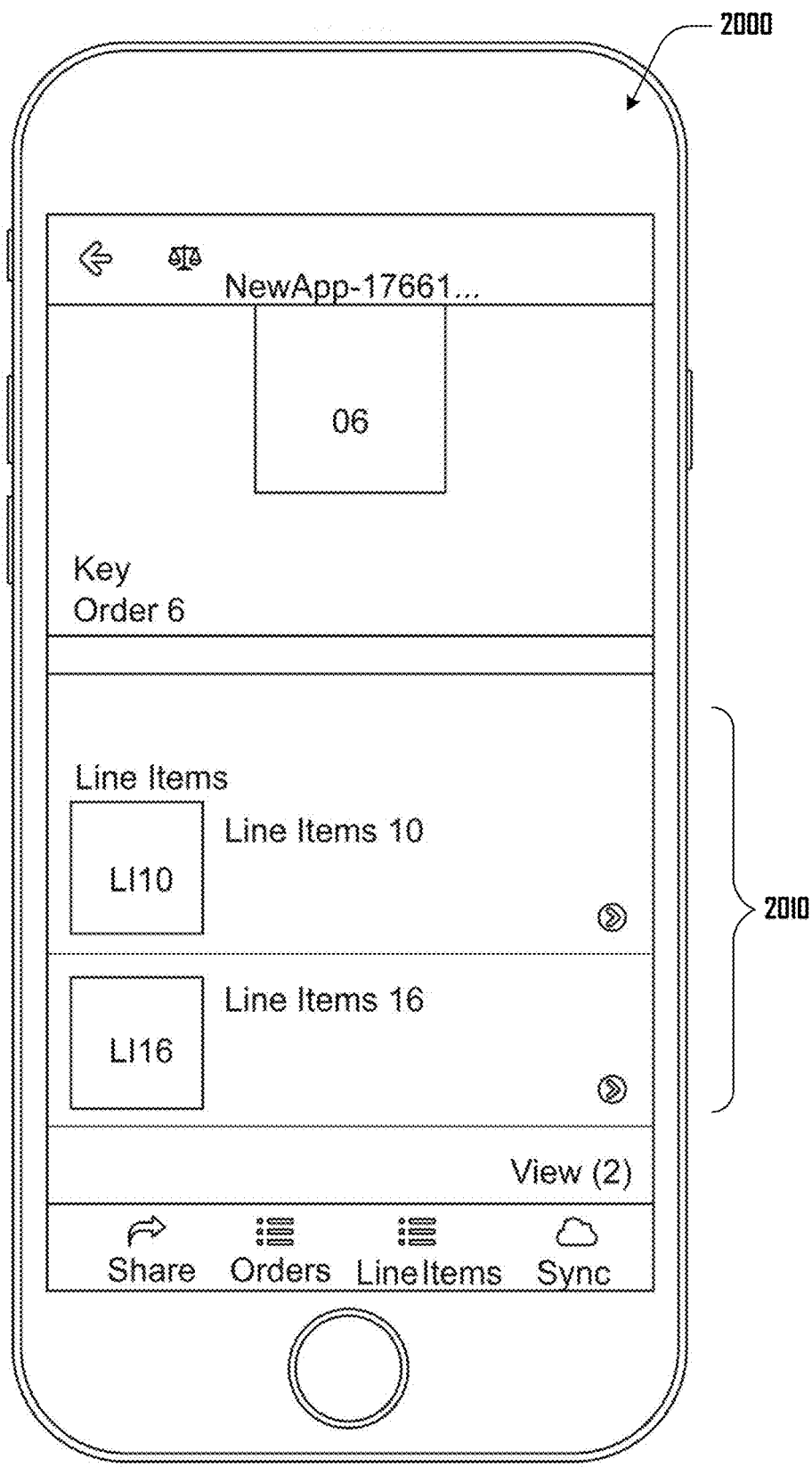

A repository of example datasets can be used to generate realistic-looking data for the most common entities mentioned in the app description. For example, embodiments of mock data is shown in FIGS. 18, 19 and 20. In various embodiments, mock data for a Person-type entity can include names, phone numbers, email addresses, websites, photos, and the like.

FIG. 18 illustrates an app interface 1800 populated with mock Person-type data including a mock image 1810 and mock biographical data 1820, which can be obtained from a mock person database. FIG. 19 illustrates an app interface 1900 populated with mock Person-type data 1910 including a mock images and mock biographical data for at least five customers, which can be obtained from a mock person database. FIG. 20 illustrates an app interface 2000 populated with mock order data 1910 including mock line item data for an order, which can be obtained from a mock order database.

For attributes in the dataset that don't appear in the repository of mock data, in various embodiments, the system can fall back to a generic value-generator that produces values that conform to a type (e.g. numbers or lat/long coordinates, and the like). A mock data generator can also generate mock relationships between records. For example, if an "Order" is made up of "Line Items," then the mock data generator can produce a random set of Line Items that are all part of the same order:

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A computer-implemented method when executed by data processing hardware causes the data processing hardware to perform operations comprising:
   receiving audio data corresponding to a spoken statement by a user, the spoken statement comprising a natural language description for creating an application;
   converting the audio data into a meaning representation of the natural language description for creating the application, the meaning representation comprising one or more inferences made from the natural language description for creating the application; and
   publishing a functional version of the application based on the natural language description, the functional version of the application executable to perform operations specified by the natural language description of the application.

2. The method of claim 1, wherein:
   the operations further comprise parsing the meaning representation of the natural language description for creating the application; and
   translating the meaning representation of the natural language description for creating the application comprises translating the parsed meaning representation of the natural language description.

3. The method of claim 1, wherein an automatic speech recognition (ASR) system converts the audio data into the meaning representation of the natural language description for creating the application.

4. The method of claim 1, wherein the operations further comprise generating a visualization of the meaning representation at an application creation interface accessible to the user.

5. The method of claim 1, wherein the operations further comprise communicating the meaning representation to a user interface of a second user collaborating with the user to create the application.

6. The method of claim 1, wherein the operations further comprise:
   generating a mockup of the functional version of the application based on the meaning representation, the mockup emulating the operations specified by the natural language description of the application; and
   displaying the mockup generated for the functional version of the application at an application creation interface.

7. The method of claim 1, wherein the meaning representation is based on a textual representation of the natural language description.

8. The method of claim 1, wherein the one or more inferences are generated by determining statistical background knowledge for an element of the meaning representation, the statistical background knowledge corresponding to statistical analysis of similar elements in other applications.

9. The method of claim 8, wherein a machine learning model performs the statistical analysis of similar elements in other application.

10. The method of claim 1, wherein the operations further comprise:
generating one or more suggestions for creating the application based on the natural language description of the application; and
prior to the functional version of the application being published, presenting the one or more suggestions to the user, the user able to decline or to accept a respective suggestion presented to the user.

11. A system comprising:
data processing hardware; and
memory hardware in communication with the data processing hardware, the memory hardware storing instructions that when executed on the data processing hardware cause the data processing hardware to perform operations comprising:
receiving audio data corresponding to a spoken statement by a user, the spoken statement comprising a natural language description for creating an application;
converting the audio data into a meaning representation of the natural language description for creating the application, the meaning representation comprising one or more inferences made from the natural language description for creating the application; and
publishing a functional version of the application based on the natural language description, the functional version of the application executable to perform operations specified by the natural language description of the application.

12. The system of claim 11, wherein:
the operations further comprise parsing the meaning representation of the natural language description for creating the application; and
translating the meaning representation of the natural language description for creating the application comprises translating the parsed meaning representation of the natural language description.

13. The system of claim 11, wherein an automatic speech recognition (ASR) system converts the audio data into the meaning representation of the natural language description for creating the application.

14. The system of claim 11, wherein the operations further comprise generating a visualization of the meaning representation at an application creation interface accessible to the user.

15. The system of claim 11, wherein the operations further comprise communicating the meaning representation to a user interface of a second user collaborating with the user to create the application.

16. The system of claim 11, wherein the operations further comprise:
generating a mockup of the functional version of the application based on the meaning representation, the mockup emulating the operations specified by the natural language description of the application; and
displaying the mockup generated for the functional version of the application at an application creation interface.

17. The system of claim 11, wherein the meaning representation is based on a textual representation of the natural language description.

18. The system of claim 11, wherein the one or more inferences are generated by determining statistical background knowledge for an element of the meaning representation, the statistical background knowledge corresponding to statistical analysis of similar elements in other applications.

19. The system of claim 18, wherein a machine learning model performs the statistical analysis of similar elements in other application.

20. The system of claim 11, wherein the operations further comprise:
generating one or more suggestions for creating the application based on the natural language description of the application; and
prior to the functional version of the application being published, presenting the one or more suggestions to the user, the user able to decline or to accept a respective suggestion presented to the user.

* * * * *